US010656094B2

(12) United States Patent
Ito et al.

(10) Patent No.: US 10,656,094 B2
(45) Date of Patent: May 19, 2020

(54) SURFACE-ENHANCED RAMAN SCATTERING UNIT

(71) Applicant: HAMAMATSU PHOTONICS K.K., Hamamatsu-shi, Shizuoka (JP)

(72) Inventors: Masashi Ito, Hamamatsu (JP); Katsumi Shibayama, Hamamatsu (JP); Kazuto Ofuji, Hamamatsu (JP); Hiroki Oyama, Hamamatsu (JP); Yoshihiro Maruyama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/576,435

(22) PCT Filed: Apr. 28, 2016

(86) PCT No.: PCT/JP2016/063432
§ 371 (c)(1),
(2) Date: Nov. 22, 2017

(87) PCT Pub. No.: WO2016/194533
PCT Pub. Date: Dec. 8, 2016

(65) Prior Publication Data
US 2018/0195966 A1  Jul. 12, 2018

(30) Foreign Application Priority Data

May 29, 2015 (JP) ................. 2015-110740

(51) Int. Cl.
G01N 21/65 (2006.01)
G01J 3/44 (2006.01)

(52) U.S. Cl.
CPC .......... *G01N 21/658* (2013.01); *G01J 3/4412* (2013.01); *G01N 2021/651* (2013.01); *G01N 2201/068* (2013.01)

(58) Field of Classification Search
CPC ............ G01N 21/658; G01N 2021/651; G01J 3/4412; H01N 2201/068
See application file for complete search history.

(56) References Cited

U.S. PATENT DOCUMENTS

| 5,939,792 A | 8/1999 | Ishikawa |
| 2007/0140900 A1 | 6/2007 | Wang et al. |

(Continued)

FOREIGN PATENT DOCUMENTS

| CN | 104508465 A | 4/2015 |
| CN | 104520694 A | 4/2015 |

(Continued)

OTHER PUBLICATIONS

International Preliminary Report on Patentability dated Dec. 14, 2017 for PCT/JP2016/063432.

*Primary Examiner* — Dominic J Bologna
(74) *Attorney, Agent, or Firm* — Faegre Drinker Biddle & Reath LLP

(57) ABSTRACT

An SERS unit includes a support 10 that includes a cavity 11 provided with an opening 12, an optical functional portion 20 that is disposed in the cavity 11 to face the opening 12 and causes surface enhanced Raman scattering, and a package 5 that accommodates the support 10 and is evacuated. The package 5 is in contact with at least an edge 12a of the opening 12, and is bent toward the optical functional portion 20 in a state in which the package 5 is spaced apart from the optical functional portion 20 in the opening 12.

9 Claims, 19 Drawing Sheets

(56) References Cited

U.S. PATENT DOCUMENTS

| | | |
|---|---|---|
| 2012/0238471 A1 | 9/2012 | Pinchuk |
| 2012/0253923 A1 | 10/2012 | Durvasula et al. |
| 2014/0253923 A1* | 9/2014 | Shibayama ............... G01J 3/26 356/451 |
| 2015/0204792 A1* | 7/2015 | Shibayama .......... G01N 21/658 356/301 |
| 2015/0233830 A1* | 8/2015 | Ito ........................ G01N 21/658 356/244 |

FOREIGN PATENT DOCUMENTS

| | | |
|---|---|---|
| JP | H11-56968 A | 3/1999 |
| JP | 2009-39905 A | 2/2009 |
| JP | 2010-201630 A | 9/2010 |
| JP | 2014-531043 A | 11/2014 |
| WO | WO-2013/062540 A1 | 5/2013 |
| WO | WO-2014-025033 A1 | 2/2014 |
| WO | WO-2014-025034 A1 | 2/2014 |

* cited by examiner

50nm

Fig.10
(a) 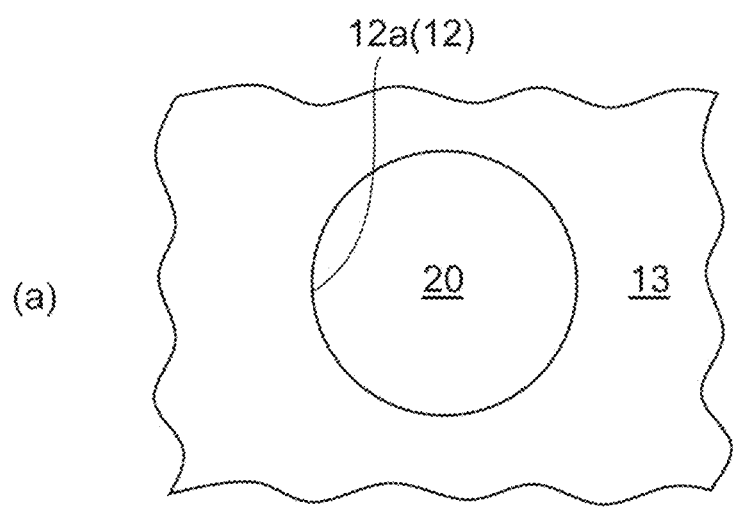
(b) 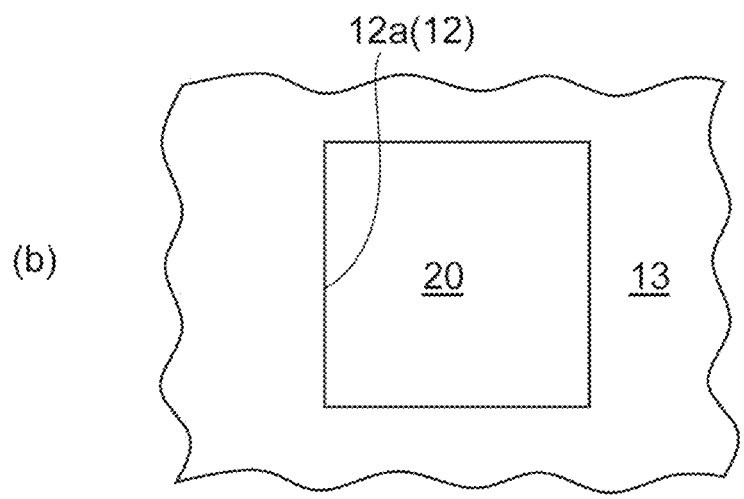

SURFACE-ENHANCED RAMAN SCATTERING UNIT

TECHNICAL FIELD

The present invention relates to a surface enhanced Raman scattering unit.

BACKGROUND ART

A surface enhanced Raman scattering unit including a support having a cavity provided with an opening, and a surface enhanced Raman scattering element including an optical functional portion that causes surface enhanced Raman scattering (SERS) and disposed in a cavity is known as a surface enhanced Raman scattering unit of the related art (see, for example, Patent Literatures 1 to 3). In the surface enhanced Raman scattering unit, the optical functional portion easily deteriorates due to oxidation due to moisture, adhesion of foreign matters, physical interference, or the like. In order to prevent the deterioration of the optical functional portion, the opening of the cavity is covered with an easily breakable cover in a device described in Patent Literature 3.

CITATION LIST

Patent Literature

[Patent Literature 1] International Publication No. 2014/025033

[Patent Literature 2] International Publication No. 2014/025034

[Patent Literature 3] Japanese Unexamined Patent Publication No. 2014-531043

SUMMARY OF INVENTION

Technical Problem

However, when the opening of the cavity is merely covered with the cover, moisture may enter the cavity through the support itself and the optical functional portion may be oxidized, for example, when the support is formed of a resin.

Therefore, an object of the present invention is to provide a surface enhanced Raman scattering unit capable of stably preventing deterioration of the optical functional portion due to various factors.

Solution to Problem

A surface enhanced Raman scattering unit of an aspect of the present invention includes: a support that includes a cavity provided with an opening; an optical functional portion that is disposed in the cavity to face the opening and causes surface enhanced Raman scattering; and a package that accommodates the support and is evacuated, wherein the package is in contact with at least an edge of the opening, and is bent toward the optical functional portion in a state in which the package is spaced apart from the optical functional portion in the opening.

In this surface enhanced Raman scattering unit, the support is accommodated in the evacuated package. Therefore, it is possible to prevent moisture or other foreign matters from entering the cavity through the opening of the cavity, and moisture from entering the cavity through the support itself. Further, the package is in contact with at least the edge of the opening, and is bent toward the optical functional portion in a state in which the package is spaced apart from the optical functional portion in the opening. Therefore, it is possible to stably form a narrow sealed space in the cavity while preventing physical interference between the package and the optical functional portion. Therefore, according to the surface enhanced Raman scattering unit, it is possible to stably prevent deterioration of the optical functional portion due to various factors.

In the surface enhanced Raman scattering unit according to an aspect of the present invention, the support may include a first opening edge; and a second opening edge located on the side opposite to the optical functional portion relative to the first opening edge and located on the outer side of the first opening edge when viewed in a direction in which the optical functional portion faces the opening, the edge of the opening may be the first opening edge, and the package may be in contact with the first opening edge and the second opening edge. Thus, it is possible to further improve a degree of sealing of the sealed space formed in the cavity.

In the surface enhanced Raman scattering unit according to an aspect of the present invention, the support may include: a first opening edge; and a second opening edge located on the side opposite to the optical functional portion relative to the first opening edge and located on the outer side of the first opening edge when viewed in a direction in which the optical functional portion faces the opening, the edge of the opening may be the second opening edge, and the package may be spaced apart from the first opening edge and be in contact with the second opening edge. Accordingly, it is possible to more strongly perform exhaust from the package while preventing physical interference between the package and the optical functional portion.

In the surface enhanced Raman scattering unit of an aspect of the present invention, the support may be an elongated body, and the cavity may be disposed at a center of the support in a longitudinal direction of the support. Accordingly, for example, even when the support formed in a plate shape is warped, it is possible to prevent stress caused by the warpage of the support from acting on the optical functional portion in an unbalanced manner.

In the surface enhanced Raman scattering unit of an aspect of the present invention, the support may be an elongated body, and the cavity may be disposed at a position biased toward one side from a center of the support in a longitudinal direction of the support. Thus, for example, since stress caused by the warpage of the support is small at the position biased toward one side from the center of the support unlike the center of the support even when the support formed in a plate shape is warped, it is possible to suppress an influence on the optical functional portion due to the stress.

In the surface enhanced Raman scattering unit of an aspect of the present invention, the edge of the opening may be located on the same plane. Thus, it is possible to reliably bring the package into contact with the edge of the opening and stably form a narrow sealed space in the cavity.

In the surface enhanced Raman scattering unit of an aspect of the present invention, the region surrounding the edge of the opening in the support may be a flat surface. Thus, it is possible to more reliably bring the package into contact with the edge of the opening and more stably form the narrow sealed space in the cavity.

In the surface enhanced Raman scattering unit of an aspect of the present invention, the package may include a moisture absorption layer that absorbs moisture in the package. Accordingly, even when there is moisture in the cavity or moisture is contained in the support itself when the support is accommodated in the package, such moisture is absorbed by the moisture absorption layer, such that deterioration of the optical functional portion due to such moisture can be prevented.

In the surface enhanced Raman scattering unit of an aspect of the present invention, the optical functional portion may be provided in a surface enhanced Raman scattering element, the surface enhanced Raman scattering element may be disposed in the cavity so that the optical functional portion faces the opening, and the edge of the opening may be located on an inner side of an outer edge of the surface enhanced Raman scattering element when viewed in a direction in which the optical functional portion faces the opening. Thus, the narrow sealed space can be stably formed in the cavity while reliably preventing physical interference between the package and the optical functional portion.

Advantageous Effects of Invention

According to the present invention, it is possible to provide a surface enhanced Raman scattering unit capable of stably preventing deterioration of the optical functional portion due to various factors.

BRIEF DESCRIPTION OF DRAWINGS

FIG. 10 is a plan view of an opening of a modification example of the surface enhanced Raman scattering unit.

DESCRIPTION OF EMBODIMENTS

Hereinafter, preferred embodiments of the present invention will be described in detail with reference to the drawings. In each figure, the same or corresponding portions are denoted with the same reference signs, and repeated description will be omitted.

First Embodiment

Figure 1:
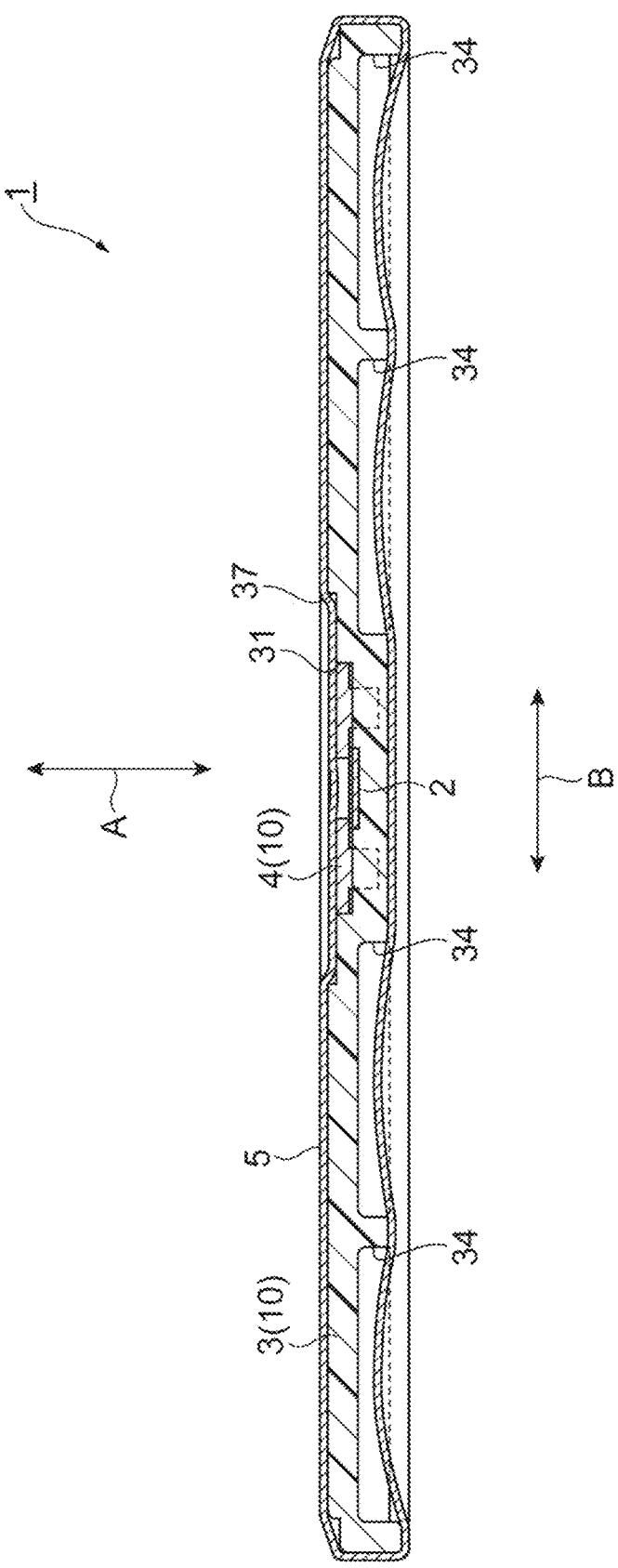
FIG. 1 is a cross-sectional view of a surface enhanced Raman scattering unit of a first embodiment of the present invention.

As illustrated in FIG. 1, a SERS unit (surface enhanced Raman scattering unit) 1 of a first embodiment includes a SERS element (surface enhanced Raman scattering element) 2, a support substrate 3, a support member 4, and a package 5. The support substrate 3 and the support member 4 constitute a support 10 that supports the SERS element 2. The support 10 is an elongated body in which a direction A is a thickness direction and a direction B is a longitudinal direction. FIG. 1 is a cross-sectional view taken along an alternated long and short dash line in FIG. 3, and is a cross-sectional view viewed from an arrow I.

Figure 2:
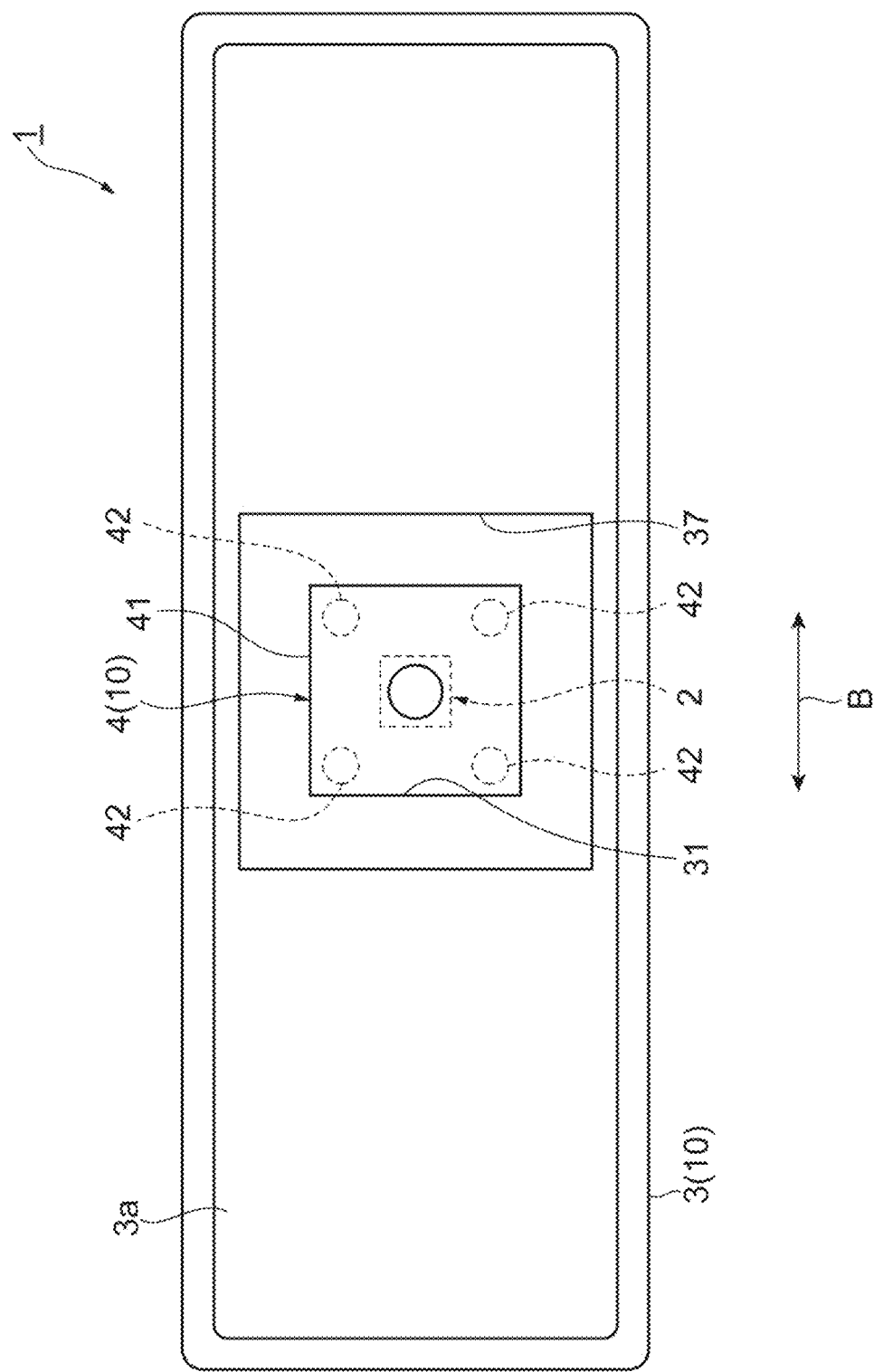
FIG. 2 is a plan view of the surface enhanced Raman scattering unit of FIG. 1 in which a package is omitted.
Figure 3:
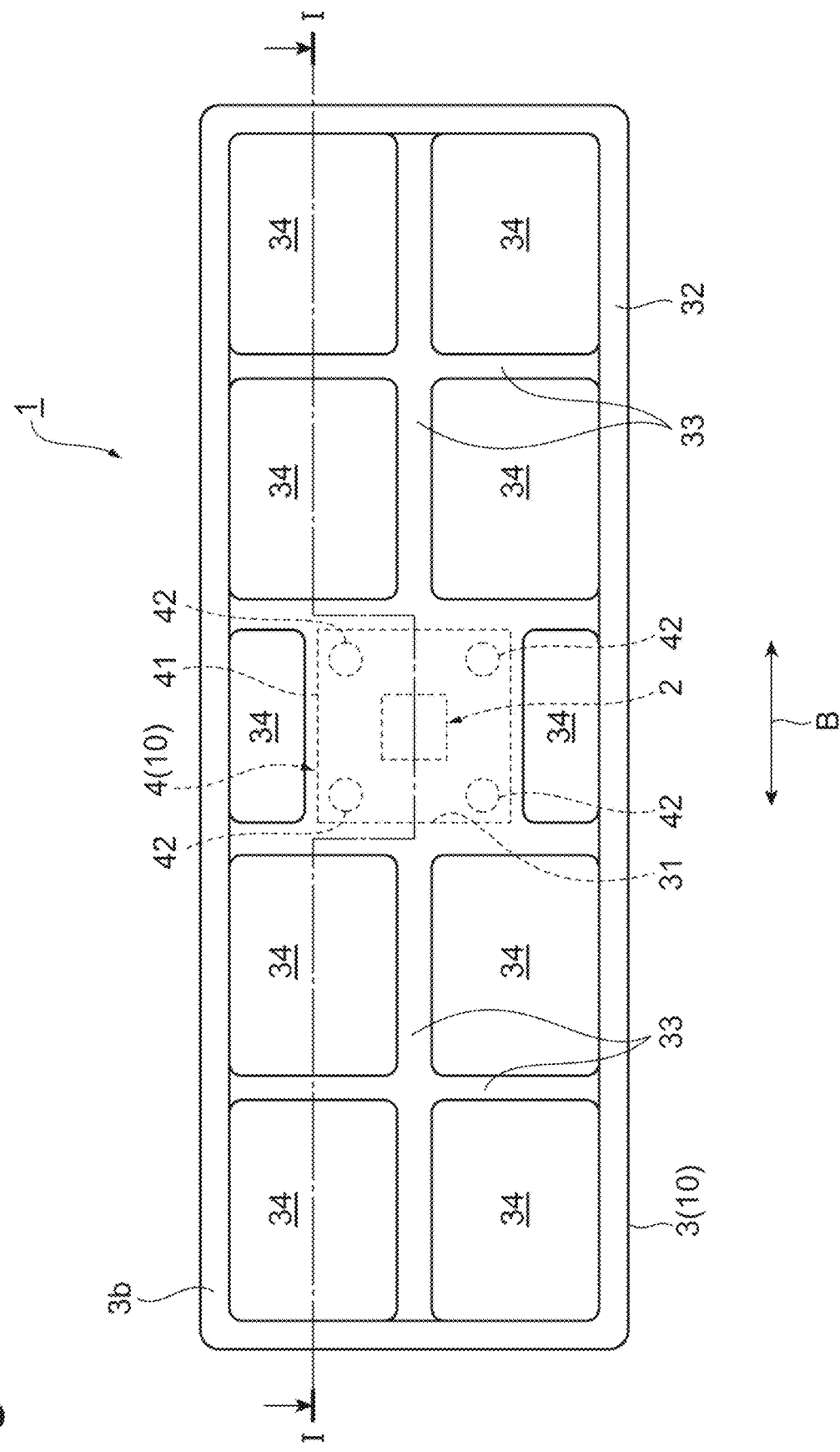
FIG. 3 is a bottom view of the surface enhanced Raman scattering unit of FIG. 1 in which the package is omitted.

As illustrated in FIG. 2, a concave portion 31 that accommodates the SERS element 2 and the support member 4 is provided on a surface 3a of the support substrate 3. The concave portion 31 is disposed at a center of the support substrate 3 in a longitudinal direction B of the support 10. As illustrated in FIG. 3, a plurality of concave portions 34 are provided on a back surface 3b of the support substrate 3 so that wall portions 32 and 33 extending in a direction perpendicular to a thickness direction of the support substrate 3 are formed. For example, the wall portion 32 is formed in an annular shape along an outer edge of the support substrate 3. The wall portion 33 is formed in a lattice shape on an inner side of the wall portion 32. The support substrate 3 is formed in a rectangular plate shape in which a direction A is a thickness direction and a direction B is a longitudinal direction (see FIG. 1). The concave portion 31 and each concave portion 34 are formed in a rectangular parallelepiped shape. The support substrate 3 is formed of, for example, a resin (for example, polypropylene, styrene resin, ABS resin, polyethylene, PET, PMMA, silicone, or a liquid crystal polymer), ceramics, glass, silicon or the like and is formed integrally by molding, cutting, etching, or the like. For example, the support substrate 3 is formed of a resin with a light absorption color (for example, black) or a light reflection color (for example, white) with respect to ambient light.

Figure 4:
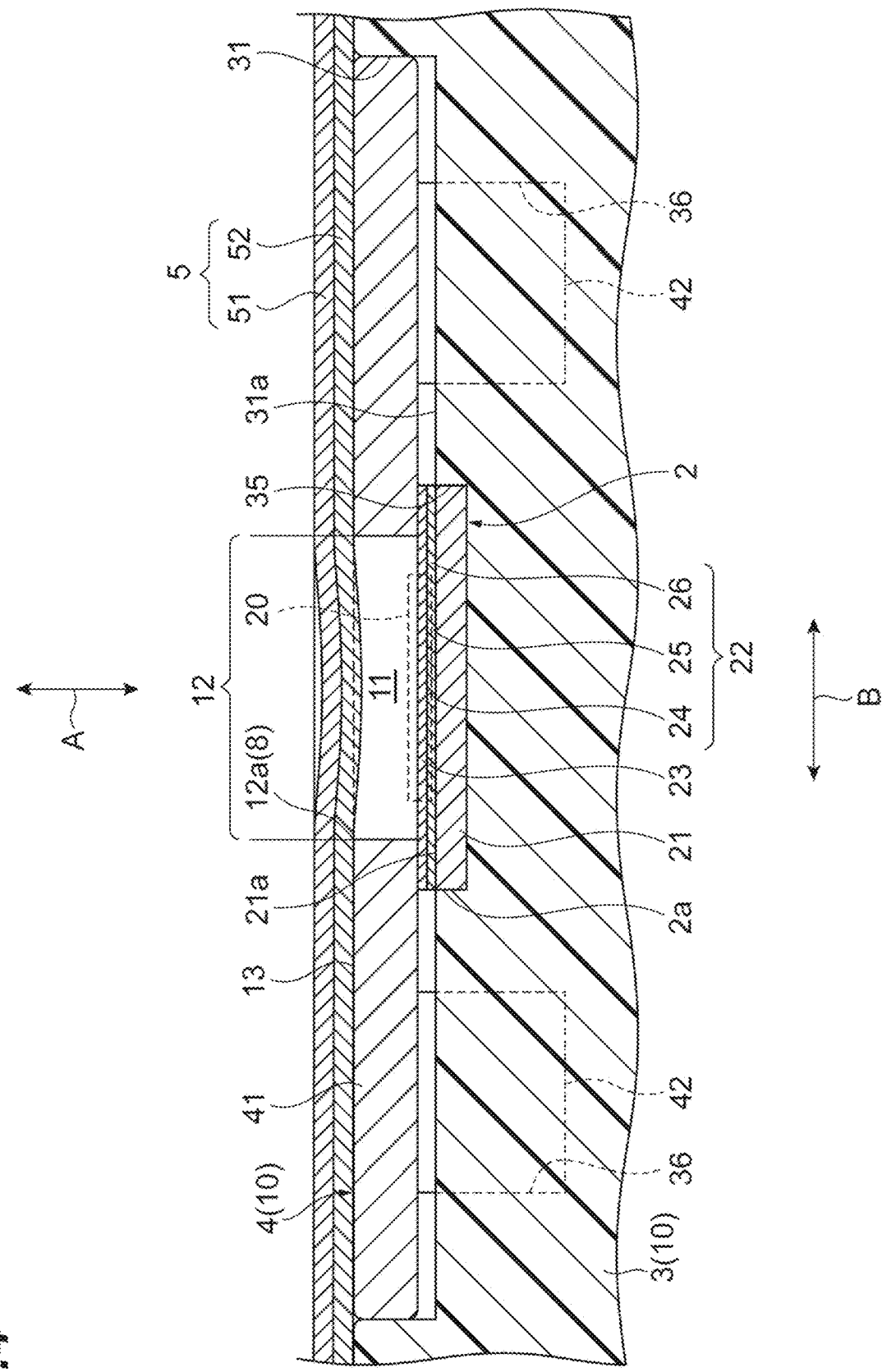
FIG. 4 is a partially enlarged cross-sectional view of the surface enhanced Raman scattering unit of FIG. 1.

As illustrated in FIG. 4, the SERS element 2 includes a substrate 21, a molded layer 22, and a conductor layer 23. For example, the substrate 21 is formed of silicon, glass, or the like in a rectangular plate shape, and has an outer shape of about hundreds of µm×hundreds of µm to tens of mm×tens of mm and a thickness of about 100 µm to 2 mm.

The molded layer 22 is formed on the substrate 21, and includes a fine structure portion 24, a support portion 25, and a frame portion 26. The fine structure portion 24 is a region having a periodic pattern and is formed on a surface layer on the side opposite to the substrate 21 in a central portion of the molded layer 22. The support portion 25 is a region that supports the fine structure portion 24, and is formed on a surface 21a of the substrate 21. The frame portion 26 is an annular region that surrounds the support portion 25 and is formed on the surface 21a of the substrate 21.

For example, the fine structure portion 24 has a rectangular outer shape of hundreds of μm×hundreds of μm to tens of mm×tens of mm when viewed from one side in the thickness direction A of the support substrate 3. In the fine structure portion 24, a plurality of pillars having a thickness and a height of about several nm to hundreds of nm are periodically disposed at a pitch of about tens of nm to hundreds of nm as a periodic pattern. The support portion 25 and the frame portion 26 have a thickness of about tens of nm to tens of μm. The molded layer 22 is formed of, for example, a resin (acrylic-base, fluorine-base, epoxy-base, silicone-base, urethane-base, PET, polycarbonate, inorganic and organic hybrid material, or the like) or low melting point glass disposed on the substrate 21, and is integrally formed using a nanoimprint method.

The conductor layer 23 is formed on the molded layer 22 to extend from the fine structure portion 24 to the frame portion 26. In the fine structure portion 24, the conductor layer 23 reaches the surface of the support portion 25 exposed on the side opposite to the substrate 21. For example, the conductor layer 23 has a thickness of about several nm to several μm. The conductor layer 23 includes a conductor such as a metal (Au, Ag, Al, Cu, Pt or the like), and is formed integrally by deposition.

Figure 5:
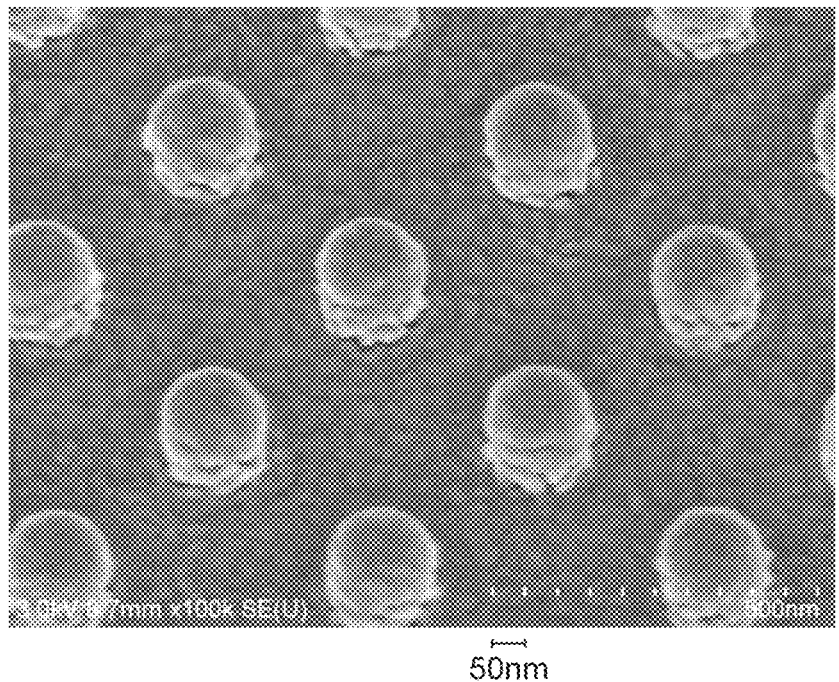
FIG. 5 is an SEM photograph of an optical functional portion of the surface enhanced Raman scattering unit of FIG. 1.

In the SERS element 2, the conductor layer 23 formed on the surface of the fine structure portion 24 and the surface of the support portion 25 exposed on the side opposite to the substrate 21 constitute an optical functional portion 20 that causes surface enhanced Raman scattering. As a reference, an SEM photograph of the optical functional portion 20 is illustrated in FIG. 5. The optical functional portion illustrated in FIG. 5 is obtained by depositing Au as a conductive layer on the fine structure portion of a nanoimprint resin having a plurality of pillars that are periodically disposed. A distance between adjacent pillars (distance between center lines) is 360 nm. A diameter of each pillar is 120 nm, and a height of each pillar is 180 nm. The film thickness of the conductive layer is about 50 nm.

As illustrated in FIG. 1, a concave portion 37 widened to include an opening is provided in the opening of the concave portion 31. As illustrated in FIG. 4, a concave portion 35 that accommodates a part of the SERS element 2 on the substrate 21 side is provided on the bottom surface 31a of the concave portion 31. The concave portion 35 is formed in a shape having a complementary relationship with a part of the SERS element 2 on the substrate 21 side and regulates a movement of the SERS element 2 in a direction perpendicular to the thickness direction of the substrate 21.

The support member 4 includes a sandwiching portion 41 and a plurality of leg portions 42. The sandwiching portion 41 is formed in an annular shape to surround the optical functional portion 20 when viewed in the thickness direction of the substrate 21. Each leg portion 42 extends from the sandwiching portion 41 to the back surface 3b of the support substrate 3. On a bottom surface 31a of the concave portion 31, a plurality of fitting holes 36 are provided to correspond to the respective leg portions 42. Each fitting hole 36 has a bottom and does not pass through the support substrate 3. Each leg portion 42 is fitted in one of the fitting holes 36 in a state in which the sandwiching portion 41 surrounds the optical functional portion 20 and is in contact with the conductor layer 23 of the SERS element 2. By sandwiching the SERS element 2 between the support substrate 3 and the sandwiching portion 41 of the support member 4 in the concave portion 35, the SERS element 2 can be mechanically held (that is, by fitting members without using an adhesive or the like) in the support 10.

For example, the sandwiching portion 41 is formed so that an outer edge thereof is rectangular and an inner edge thereof is circular when viewed in the thickness direction of the substrate 21. Each leg portion 42 extends from one of four corner portions of the sandwiching portion 41 to the back surface 3b of the support substrate 3. By making the inner edge of the sandwiching portion 41 circular, action of a local pressing force on the SERS element 2 is avoided. Each leg portion 42 and each fitting hole 36 are formed in a cylindrical shape. The support member 4 is formed of, for example, a resin (for example, polypropylene, styrene resin, ABS resin, polyethylene, PET, PMMA, silicone, or a liquid crystal polymer), ceramics, glass, silicon or the like and is formed integrally by molding, cutting, etching, or the like. For example, the support member 4 is formed of a resin with a light absorption color (for example, black) or a light reflection color (for example, white) with respect to ambient light.

In the SERS unit 1 of the first embodiment configured as described above, a region extending from an inner side of the concave portion 35 of the support substrate 3 to an inner side of the sandwiching portion 41 of the support member 4 constitutes the cavity 11 provided with an opening 12 (an opening on the side opposite to the SERS element 2 in the sandwiching portion 41), as illustrated in FIG. 4. In other words, the support 10 constituted by the support substrate 3 and the support member 4 includes the cavity 11 provided with the opening 12. The cavity 11 is disposed at a center of the support 10 in the longitudinal direction B of the support 10. An edge 12a of the opening 12 is located on the same plane. A region 13 (a surface on the side opposite to the SERS element 2 in the sandwiching portion 41) surrounding the edge 12a of the opening 12 in the support 10 is a flat surface.

The SERS element 2 is disposed in the cavity 11 so that the optical functional portion 20 faces the opening 12. The edge 12a of the opening 12 is located on the inner side of the outer edge 2a of the SERS element 2 when viewed in a direction in which the optical functional portion 20 faces the opening 12. In this state, the support 10 constituted by the support substrate 3 and the support member 4 is accommodated in the package 5.

Figure 6:
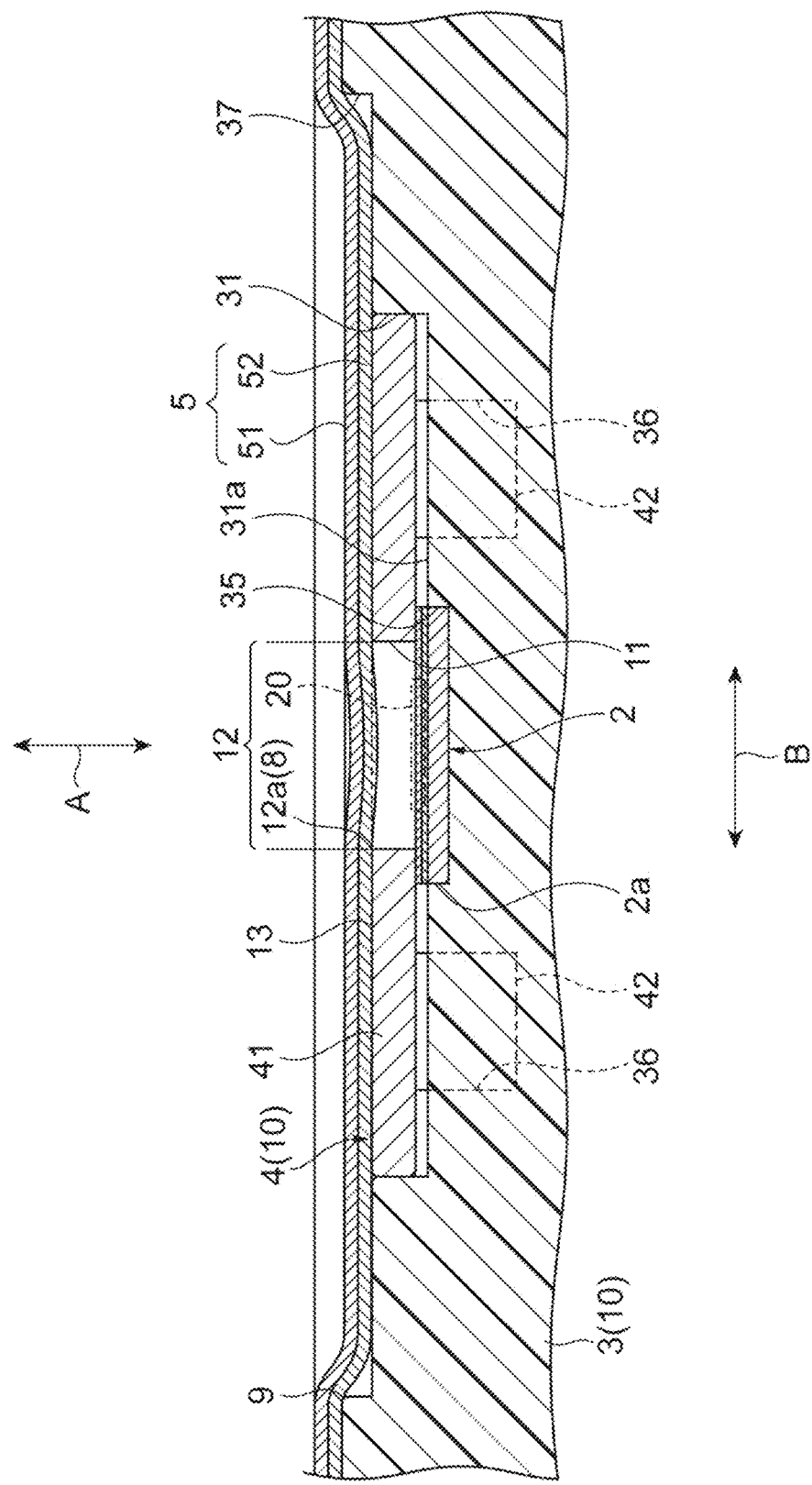
FIG. 6 is a partially enlarged cross-sectional view of the surface enhanced Raman scattering unit of FIG. 1.

In the support 10 of the SERS unit 1 of the first embodiment, the edge 12a of the opening 12 is the first opening edge 8, and the edge of the opening of the concave portion 37 is the second opening edge 9, as illustrated in FIG. 6. The second opening edge 9 is located on the side opposite to the optical functional portion 20 relative to the first opening edge 8 in a direction in which the optical functional portion 20 faces the opening 12 (that is, direction A), and is located on the outer side of the first opening edge 8 when viewed in the direction in which the optical functional portion 20 faces the opening 12 (that is, direction A).

The package 5 is flexible and formed in a bag shape. The package 5 is evacuated by, for example, vacuuming (that is, a gas such as air present in the package 5 is discharged to the outside of the package 5) in a state in which the package 5 accommodates the support 10, and is sealed by, for example, thermo-compression bonding. The package 5 is in contact with the edge 12a of the opening 12 and the region 13 surrounding the edge 12a of the opening 12. Thus, the opening 12 is sealed without a gap between the package 5 and the support 10. The package 5 is bent toward the optical functional portion 20 in a state in which the package 5 is spaced apart from the optical functional portion 20 in the opening 12. In the SERS unit 1 of the first embodiment, the package 5 is in contact with the first opening edge 8 and the second opening edge 9, as illustrated in FIG. 6. The package 5 is bent toward the inner side of each concave portion 34 in each concave portion 34 on the back surface 3b side of the support substrate 3, as illustrated in FIG. 1. The bag-shaped package 5 includes a package of which a portion (for example, a bottom surface and a side surface) is hard and only the remaining portion (for example, an upper surface) is flexible.

As illustrated in FIG. 6, R chamfering is performed on the opening of the concave portion 31 of the support substrate 3, the opening of the concave portion 37, the outer edge portion of the sandwiching portion 41 of the support member 4, or the like. Thus, it is possible to prevent great tension from being generated locally in the package 5 and to avoid breakage of the package 5.

Figure 7:
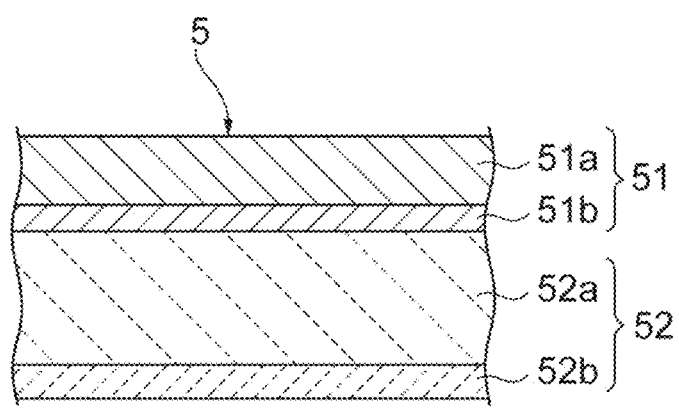
FIG. 7 is a partially enlarged cross-sectional view of a package of the surface enhanced Raman scattering unit of FIG. 1.

As illustrated in FIG. 7, the package 5 includes an outer layer 51 and an inner layer 52. The outer layer 51 includes, for example, a base layer 51a formed of polyester (PET, PEN, or the like) or polyamide (nylon or the like), and an aluminum layer 51b laminated on the inner side of the base layer 51a. The inner layer 52 includes a moisture absorption layer 52a laminated on the inner side of the aluminum layer 51b, and a sealant layer 52b laminated on the inner side of the moisture absorption layer 52a. The respective layers are bonded to each other by polyethylene, an adhesive, or the like. The moisture absorption layer 52a absorbs moisture in the package 5. The moisture absorption layer 52a contains, for example, porous silica, porous zeolite, calcium oxide, calcium chloride, or magnesium chloride.

Figure 8:
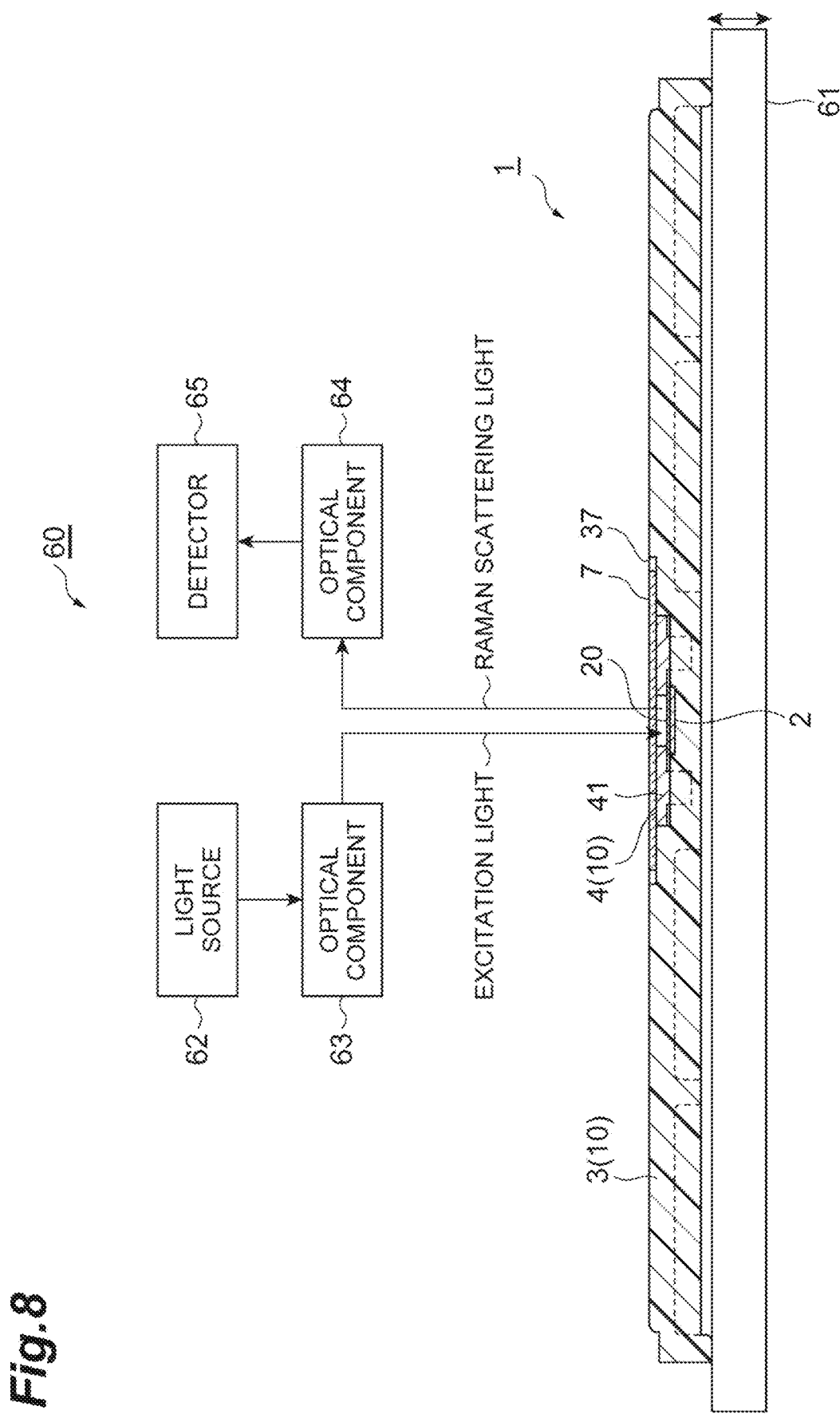
FIG. 8 is a configuration diagram of a Raman spectroscopic analysis device in which the surface enhanced Raman scattering unit of FIG. 1 is set.

Next, a Raman spectroscopic analysis method using the SERS unit 1 of the first embodiment will be described. As illustrated in FIG. 8, a Raman spectroscopic analysis device 60 for embodying the Raman spectroscopic analysis method includes a stage 61, a light source 62, an optical component 63, an optical component 64, and a detector 65. The stage 61 supports the SERS unit 1. The light source 62 emits excitation light. The optical component 63 performs collimation, filtering, condensing, and the like needed to irradiate the optical functional portion 20 with the excitation light. The optical component 64 performs collimation, filtering, and the like needed to guide Raman scattering light to the detector 65. The detector 65 detects the Raman scattering light.

First, the SERS unit 1 is prepared and the package 5 is removed from the SERS unit 1. A solution sample (or a powder sample dispersed in a solution such as water or ethanol) is dropped in a region on the inner side of the sandwiching portion 41 of the support member 4, and the solution sample is disposed on the optical functional portion 20. Subsequently, in order to reduce a lens effect, a cover 7 having light transmittance is disposed in the concave portion 37 of the support substrate 3, and the cover 7 is brought into contact with the solution sample.

Then, the support substrate 3 is disposed on the stage 61, and the SERS unit 1 is set in the Raman spectroscopic analysis device 60. Subsequently, the solution sample is excited by irradiating the solution sample with the excitation light emitted from the light source 62 via the optical component 63. In this case, the stage 61 is moved so that the excitation light is focused on the optical functional portion 20. Accordingly, surface enhanced Raman scattering occurs at an interface between the optical functional portion 20 and the solution sample, and Raman scattering light from the solution sample is increased to, for example, about $10^8$ times and discharged. The Raman spectroscopic analysis is performed by detecting the emitted Raman scattering light using the detector 65 via the optical component 64.

Methods of disposing the sample on the optical functional portion 20 include the following methods, in addition to the above-described method. For example, the SERS element 2 may be immersed in a solution sample (or a sample of a powder dispersed in a solution such as water or ethanol) with the support substrate 3 grasped and then pulled up, and the sample may be blown dry. Further, a small amount of a solution sample (or a powder sample dispersed in a solution such as water or ethanol) may be dropped onto the optical functional portion 20, and the sample may be naturally dried. Further, a sample that is a powder may be dispersed directly on the optical functional portion 20. In this case, the cover 7 may not be disposed at the time of measurement.

Next, effects of the SERS unit 1 of the first embodiment will be described. In the SERS unit 1, the support 10 constituted by the support substrate 3 and the support member 4 is accommodated in the evacuated package 5, as illustrated in FIGS. 1 and 4. Therefore, it is possible to prevent moisture and other foreign matters from entering the cavity 11 via the opening 12 of the cavity 11. Further, even when, for example, the support substrate 3 and the support member 4 are formed of a resin, it is possible to prevent moisture from entering the cavity 11 via the support 10 itself. Further, the package 5 is in contact with the edge 12a of the opening 12 and is bent toward the optical functional portion 20 in a state in which the package 5 is spaced apart from the optical functional portion 20 in the opening 12. Therefore, it is possible to stably form a narrow sealed space in the cavity 11 while preventing physical interference between the package 5 and the optical functional portion 20. Therefore, according to the SERS unit 1, it is possible to stably prevent deterioration of the optical functional portion 20 due to various factors.

Further, in the SERS unit 1, the package 5 is in contact with the first opening edge 8 and the second opening edge 9 of the support 10. Accordingly, it is possible to further improve a degree of sealing of the sealed space formed in the cavity 11.

Further, in the SERS unit 1, the edge 12a of the opening 12 is located on the same plane, and the region 13 surrounding the edge 12a of the opening 12 in the support 10 is a flat surface. Accordingly, the package 5 is more reliably brought into contact with the edge 12a of the opening 12, such that a narrow sealed space can be more stably formed in the cavity 11.

Further, in the SERS unit 1, the cavity 11 is disposed at the center of the support 10 in the longitudinal direction B of the support 10. Accordingly, even when the support 10 formed in a plate shape warps, it is possible to prevent stress generated due to the warpage of the support 10 from acting on the optical functional portion 20 in an unbalanced manner.

In the SERS unit 1, the support substrate 3 and the support member 4 (that is, the support 10) are formed of a resin with a light absorption color (for example, black) or a light reflection color (for example, white) with respect to ambient light. Thus, it is possible to prevent ambient light from entering the cavity 11 via the support 10 and to accurately embody Raman spectroscopic analysis.

Further, in the SERS unit 1, the package 5 includes the moisture absorption layer 52a that absorbs moisture in the package 5. Accordingly, even when there is moisture in the cavity 11 or moisture is contained in the support 10 itself when the support 10 is accommodated in the package 5, such moisture is absorbed in the moisture absorption layer 52a, such that deterioration of the optical functional portion 20 due to such moisture can be prevented. In particular, since the moisture absorption layer 52a faces the cavity 11, it is possible to efficiently remove the moisture in the cavity 11. Further, since the package 5 is in close contact with the support 10 due to exhaust, the moisture contained in the support 10 itself can be efficiently absorbed by the moisture absorption layer 52a.

Further, in the SERS unit 1, the edge 12a of the opening 12 is located on an inner side of the outer edge 2a of the SERS element 2 when viewed in a direction in which the optical functional portion 20 faces the opening 12. Thus, the narrow sealed space can be stably formed in the cavity 11 while reliably preventing physical interference between the package 5 and the optical functional portion 20.

Further, in the SERS unit 1, the support 10 having one cavity 11 is accommodated in one package 5. Thus, it is possible to prevent the shape of the sealed space formed in the cavity 11 from varying as the package 5 is bent. Therefore, it is possible to reduce individual differences among a plurality of the SERS units 1, and more stably prevent the deterioration of the optical functional portion 20.

Further, in the SERS unit 1, the package 5 is bent on the inner side of the concave portion 34 in each concave portion 34 of the back surface 3b side of the support substrate 3. Thus, it is possible to reduce a volume in the package 5 after sealing, and to suppress the amount of moisture contained in the package 5. Further, a surface area of the moisture absorption layer 52a is increased due to bending of the package 5 in each concave portion 34. Accordingly, it is possible to build a low humidity environment in the package 5.

Further, in the SERS unit 1, the package 5 has an aluminum layer 51b. Thus, external air and moisture are prevented from entering the package 5, and light is prevented from being incident on the package 5, for example. Therefore, it is possible to prevent the respective portions constituting the SERS unit 1 from deteriorating due to external air, moisture, light, or the like. Further, the aluminum layer 51b is less ductile than the other layers. Therefore, it is possible to prevent the package 5 from being greatly bent and brought into contact with the optical functional portion 20 in the opening 12.

Figure 9:
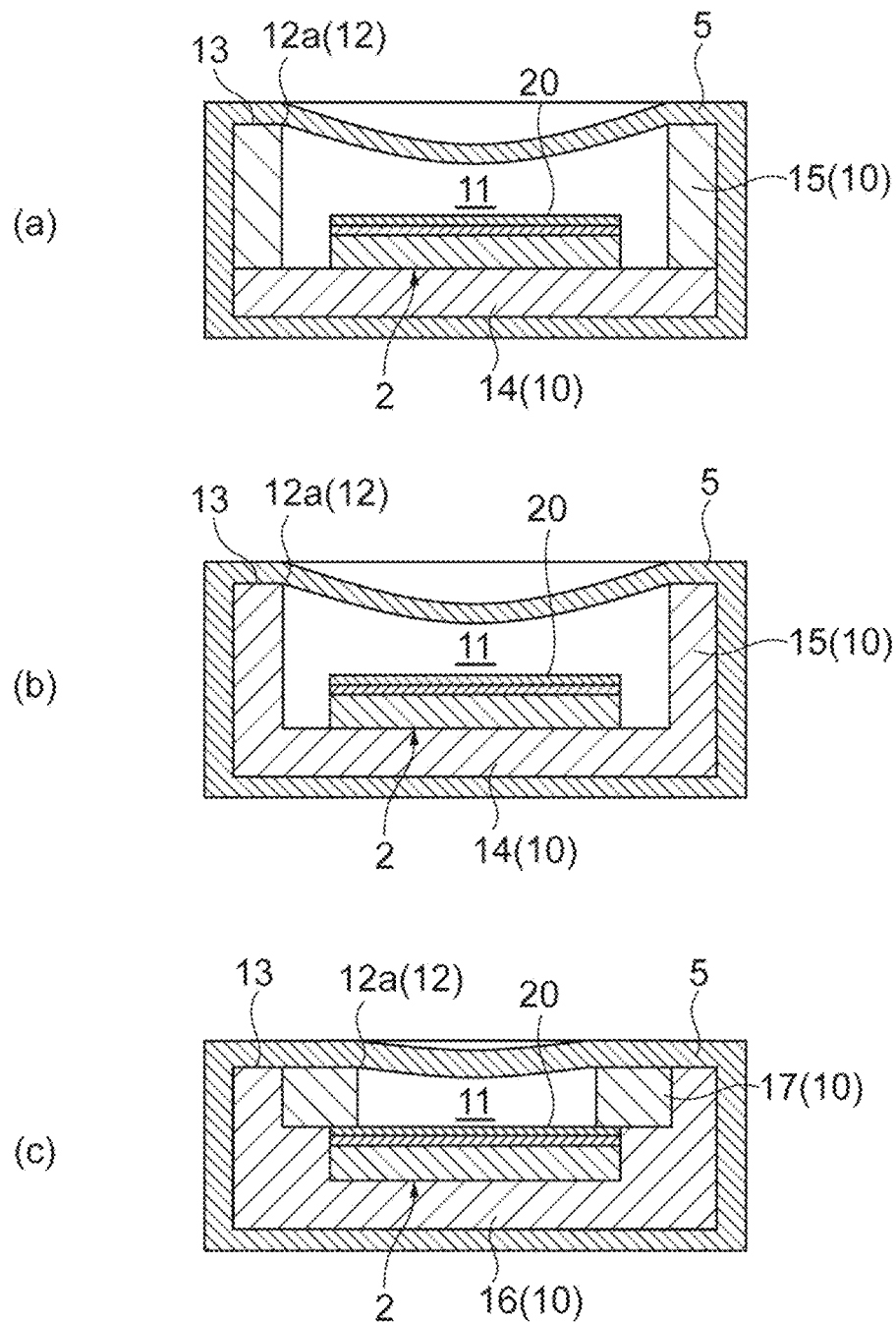
FIG. 9 is a cross-sectional view of a modification example of the surface enhanced Raman scattering unit.

Next, a modification example of the SERS unit 1 will be described. As illustrated in FIGS. 9(a) and 9(b), the support 10 is constituted by a bottom wall 14 and an annular side wall 15, and the SERS element 2 is disposed in a cavity 11 defined by the bottom wall 14 and the side wall 15.

As illustrated in FIG. 9(a), when the bottom wall 14 and the side wall 15 are separate bodies, a degree of freedom of selection of materials increases. For example, a high gas barrier material is selected as the bottom wall 14, and a material having moisture absorption characteristics is selected as the side wall 15. Further, a height of the cavity 11 is defined by a height of the side wall 15 and does not depend on a thickness of the bottom wall 14. Therefore, it is possible to easily and simultaneously adjust the height of the cavity 11 and the thickness of the bottom wall 14.

As illustrated in FIG. 9(b), when the bottom wall 14 and the side wall 15 are integral, the number of components can be reduced and low cost can be achieved. Further, junction between the bottom wall 14 and the side wall 15 is unnecessary. Since the bottom wall 14 and the side wall 15 are integral, exhaust from the opening 12 can be made uniform among individual units, and the amount of bending of the package 5 in the opening 12 can be made uniform among individual units.

As illustrated in FIG. 9(c), the support 10 may be constituted by a base 16 and a sandwiching member 17, and SERS element 2 may be sandwiched between the base 16 and the sandwiching member 17. In this modification example, the edge 12a of the opening 12 is located on an inner side of the outer edge of the SERS element 2 when viewed in a direction in which the optical functional portion 20 faces the opening 12. Thus, the narrow sealed space can be stably formed in the cavity 11 while reliably preventing physical interference between the package 5 and the optical functional portion 20. Further, it is possible to obtain the compact base 16 having a small thickness and to achieve a reduction in member costs and a reduction in an environmental load.

The edge 12a of the opening 12 may be circular as illustrated in FIG. 10(a), and the edge 12a of the opening 12 may be rectangular, as illustrated in FIG. 10(b).

When the edge 12a of the opening 12 is circular, the package 5 is uniformly bent toward the optical functional portion 20 at the time of exhaust (the package 5 in contact with the entire circumference of the edge 12a of the opening 12 is bent in a spherical shape), such that generation of local stress causing breakage of the package 5 can be prevented. Further, the amount of bending of the package 5 is smaller than that of the rectangular opening 12 having the same size (a length of each side is equal to a diameter in the case of a square, and a length of a long side is equal to a diameter in the case of a rectangle), and therefore the risk of contact of the package 5 with the optical functional portion 20 can be reduced.

When the edge 12a of the opening 12 is rectangular, the amount of bending of the package 5 is larger than that of the circular opening 12 having the same size (a diameter is equal to a length of each side in the case of a square, and a diameter is equal to a length of a long side in the case of a rectangle), and therefore a narrower sealed space in the cavity 11 can be obtained. Further, since the amount of bending of the package 5 is increased, a surface area of the moisture absorption layer 52a is increased. Thus, it is possible to more reliably remove the moisture in the cavity 11.

Figure 11:
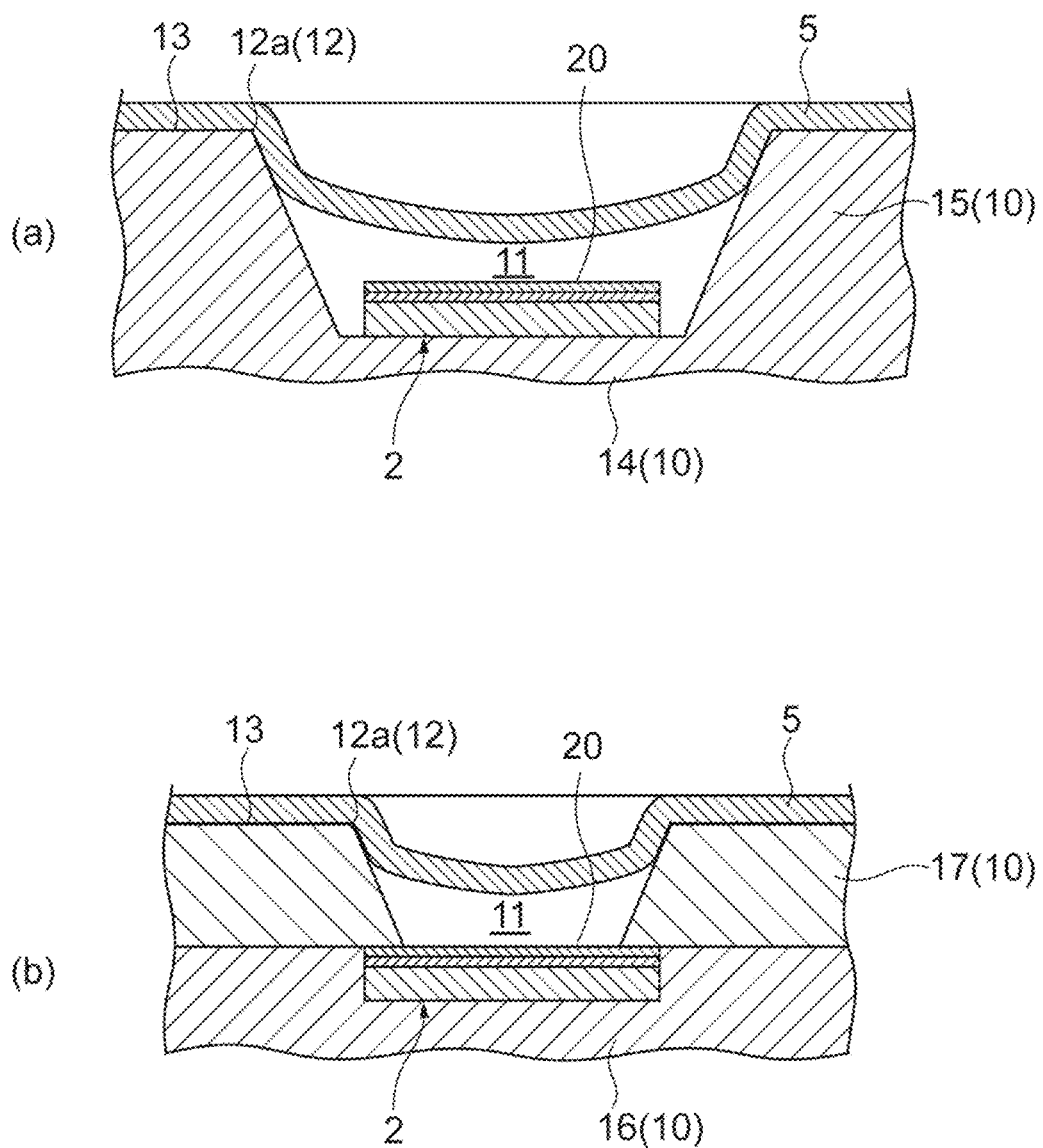
FIG. 11 is a cross-sectional view of a cavity of a modification example of the surface enhanced Raman scattering unit.
Figure 12:
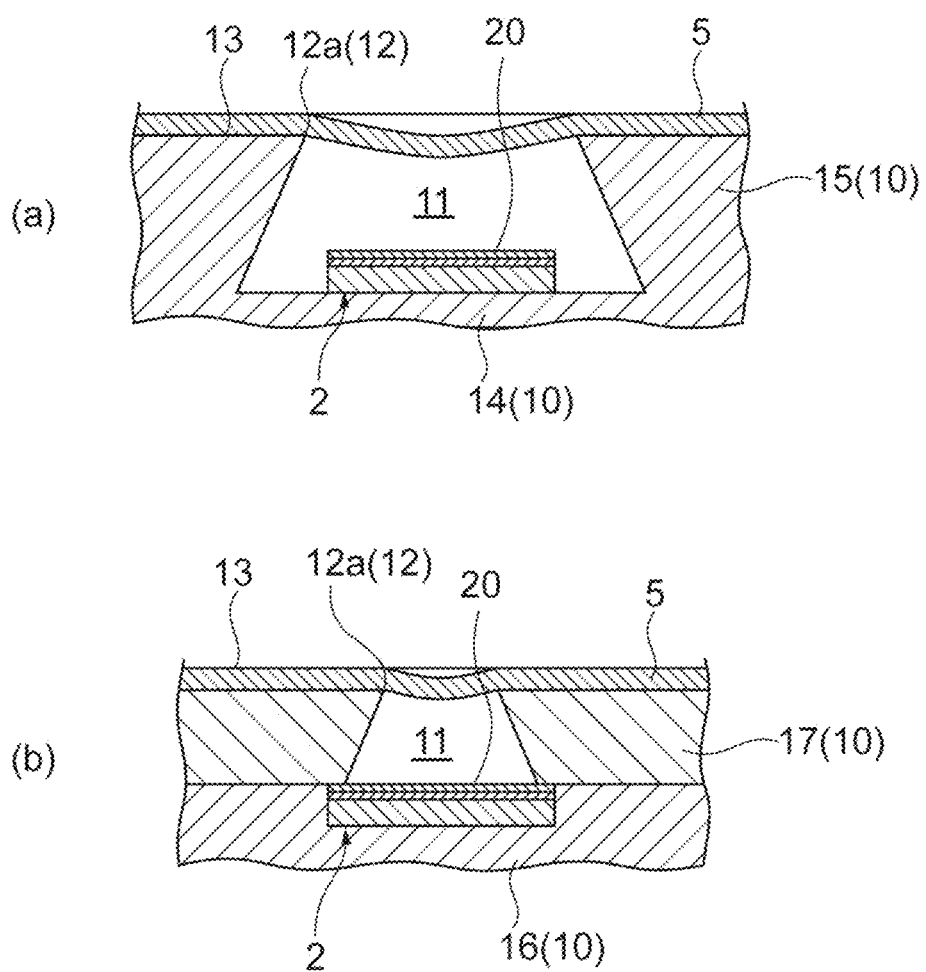
FIG. 12 is a cross-sectional view of a cavity of a modification example of the surface enhanced Raman scattering unit.

The cavity 11 may be formed in a tapered shape in which the opening 12 side is wide as illustrated in FIGS. 11(a) and 11(b), or the cavity 11 may be formed in a tapered shape in which the side opposite to the opening 12 is wide as illustrated in FIGS. 12(a) and 12(b). The support 10 may be constituted by the bottom wall 14 and the side wall 15 integral with each other as illustrated in FIGS. 11(a) and 12(a), and the support 10 may be constituted by the base 16 and the sandwiching member 17 separate from each other as illustrated in FIGS. 11(b) and 12(b).

When the cavity 11 is formed in the tapered shape in which the opening 12 side is wide, the amount of bending of the package 5 is increased and a narrower sealed space in the cavity 11 can be obtained. Further, since the amount of bending of the package 5 is increased, a surface area of the moisture absorption layer 52a is increased. Thus, it is possible to more reliably remove the moisture in the cavity 11.

When the cavity 11 is formed in the tapered shape in which the side opposite to the opening 12 is wide, the amount of bending of the package 5 is decreased, and the risk of contact of the package 5 with the optical functional portion 20 can be reduced. Further, since the amount of bending of the package 5 is decreased, a thickness of each member constituting the cavity 11 can be decreased in a range in which the package 5 does not come in contact with the optical functional portion 20. Thus, it is possible to achieve low cost and a reduction in an environmental load.

Figure 13:
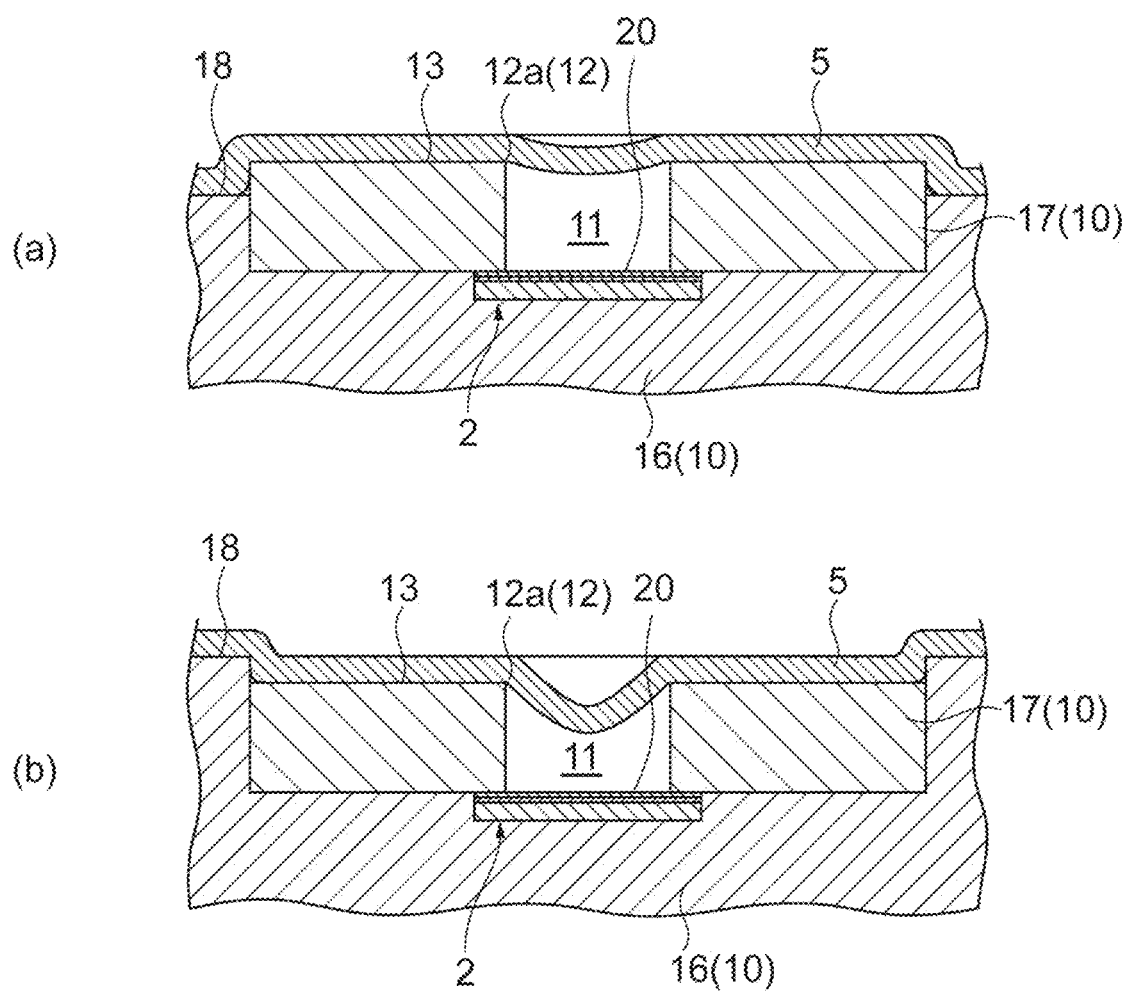
FIG. 13 is a cross-sectional view of a cavity of a modification example of the surface enhanced Raman scattering unit.

In the support 10, the region 13 surrounding the edge 12a of the opening 12 may be located on the side opposite to the optical functional portion 20 relative to the region 18 further surrounding the region 13, as illustrated in FIG. 13(a), and in the support 10, the region 13 surrounding the edge 12a of the opening 12 may be located on the optical functional portion 20 side relative to the region 18 further surrounding the region 13, as illustrated in FIG. 13(b).

When the region 13 is located on the side opposite to the optical functional portion 20 relative to the region 18 in the support 10, a tension acting on a portion located on the opening 12 and the region 13 in the package 5 increases. Thus, by decreasing the amount of bending of the package 5, the risk of contact of the package 5 with the optical functional portion 20 can be reduced.

When the region 13 is located on the optical functional portion 20 side relative to the region 18 in the support 10, a tension acting on a portion located on the opening 12 and the region 13 in the package 5 decreases. Thus, the amount of bending of the package 5 is increased, and a narrower sealed space in the cavity 11 can be obtained. Further, since the amount of bending of the package 5 is increased, a surface area of the moisture absorption layer 52a is increased. Thus, it is possible to more reliably remove the moisture in the cavity 11. The concave portion 37 of the support substrate 3 also functions to reduce the tension acting on the portion located on the opening 12 and the region 13 in the package 5. Thus, it is possible to adjust the tension acting on the package 5 according to the shape of the support substrate 3.

Figure 14:
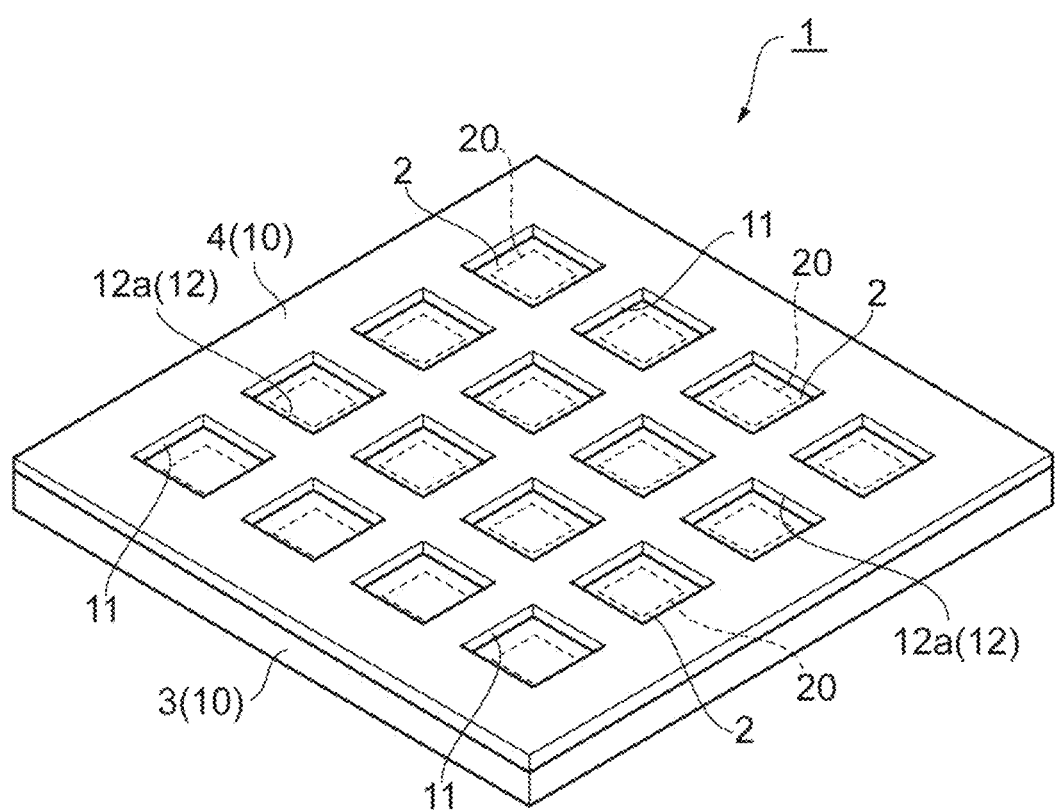
FIG. 14 is a perspective view of a modification example of a surface enhanced Raman scattering unit in which a package is omitted.

One package 5 may accommodate (one) support 10 having a plurality of cavities 11, as illustrated in FIG. 14. One SERS element 2 is provided for each cavity 11, and the package 5 is bent toward the optical functional portion 20 in the opening 12 of each cavity 11, such that a narrow sealed space in which the SERS element 2 (optical functional portion 20) is disposed can be formed uniformly in each cavity 11. Thus, in the SERS unit 1, it is possible to reduce an individual difference of the spatial shape of each cavity 11 in which the SERS element 2 is disposed and to stably prevent the deterioration of the optical functional portion 20.

When one SERS unit 1 in which the support 10 including a plurality of cavities 11 is accommodated in one package 5, compared to when a plurality of SERS units 1 in which the support 10 having one cavity 11 is accommodated in one package 5 are used, performing exhaust work for each cavity 11 under the same conditions is guaranteed, and therefore an individual difference of a spatial shape of each cavity 11 decreases.

Next, examples of dimensions of the SERS unit 1 will be described. For example, as illustrated in FIG. 9(c), in a case in which the SERS element 2 is sandwiched in the support 10, a length of each side of the edge 12a is 50% to 95% of the length of each side of the SERS element 2 when viewed in a direction in which the optical functional portion 20 faces the opening 12 when the edge 12a of the opening 12 is rectangular. Further, in a case in which the SERS element 2 is sandwiched in the support 10, a diameter of the edge 12a is 50% to 95% of a length of a diagonal of the SERS element 2 when viewed in the direction in which the optical functional portion 20 faces the opening 12 when the edge 12a of the opening 12 is circular.

For example, in a case in which the SERS element 2 is not sandwiched in the support 10 as illustrated in FIGS. 9(a) and 9(b), when the edge 12a of the opening 12 is rectangular, a length of each side of the edge 12a is in a range from "a length of a long side of the SERS element 2 when viewed in the direction in which the optical functional portion 20 faces the opening 12" to "a length of the long side+1 mm." In a case in which the SERS element 2 is not sandwiched in the support 10, when the edge 12a of the opening 12 is circular, a diameter of the edge 12a is in a range from "a length of a diagonal line of the SERS element 2 when viewed in a direction in which the optical functional portion 20 faces the opening 12" to "the length of the diagonal line+1 mm."

When the edge 12a of the opening 12 is rectangular, the amount of bending of the package 5 in the opening 12 is 0.01 times to 0.1 times the length of a diagonal line of the edge 12a. When the edge 12a of the opening 12 is circular, the amount of bending of the package 5 in the opening 12 is 0.01 times to 0.1 times the diameter of the edge 12a.

A distance from a bottom portion (a most bent portion) of bending of the package 5 in the opening 12 to a surface (that is, the optical functional portion 20) of the SERS element 2 is set to a distance from 300 µm to 1.3 mm, and therefore it is possible to stably form a narrow sealed space in the cavity 11 while preventing physical interference between the package 5 and the optical functional portion 20.

Second Embodiment

Figure 15:
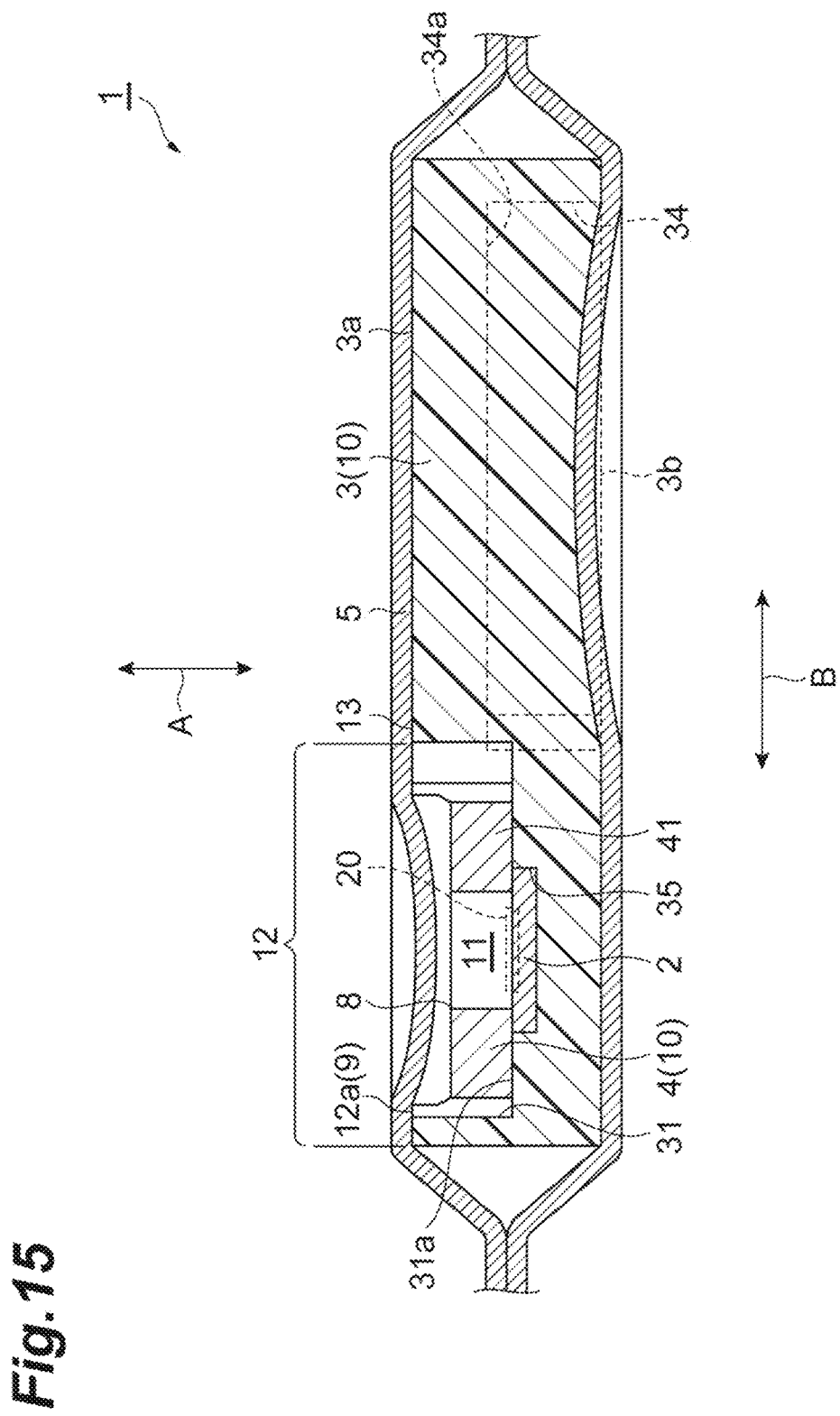
FIG. 15 is a cross-sectional view of a surface enhanced Raman scattering unit according to a second embodiment of the present invention.

As illustrated in FIG. 15, a SERS unit (surface enhanced Raman scattering unit) 1 of a second embodiment includes a SERS element (surface enhanced Raman scattering element) 2, a support substrate 3, a support member 4, and a package 5. The support substrate 3 and the support member 4 constitute a support 10 that supports the SERS element 2. The support 10 is an elongated body in which a direction A is a thickness direction and a direction B is a longitudinal direction.

Figure 16:
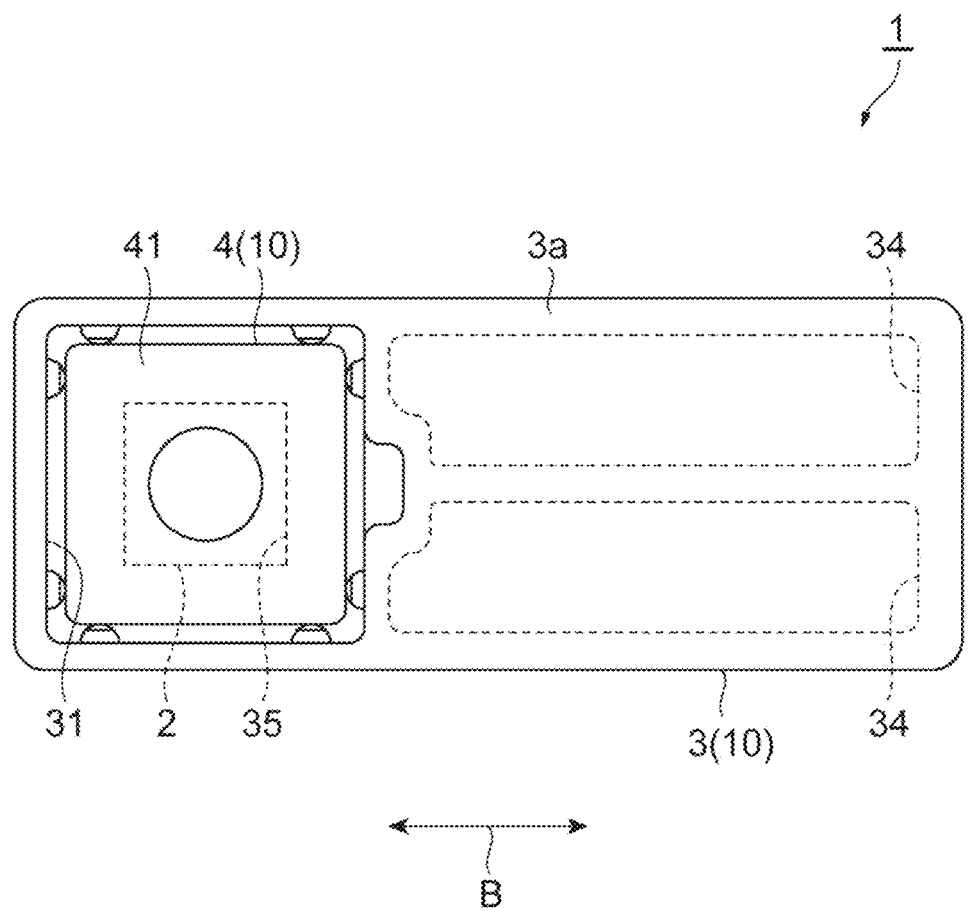
FIG. 16 is a plan view of a surface enhanced Raman scattering unit of FIG. 15 in which the package is omitted.
Figure 17:
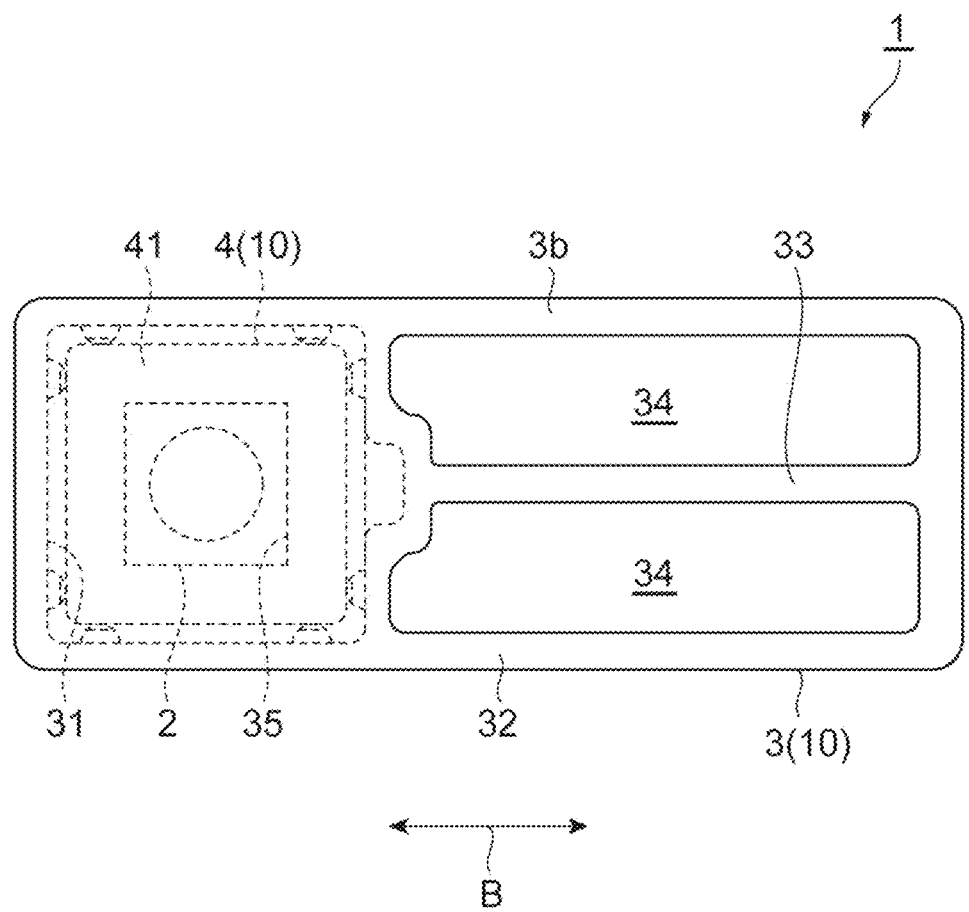
FIG. 17 is a bottom view of the surface enhanced Raman scattering unit of FIG. 15 in which the package is omitted.

As illustrated in FIG. 16, a concave portion 31 that accommodates the SERS element 2 and the support member 4 is provided on a surface 3a of the support substrate 3. The concave portion 31 is disposed at a position biased toward one side from a center of the support substrate 3 in a longitudinal direction B of the support 10. As illustrated in FIG. 17, a plurality of concave portions 34 are provided on a back surface 3b of the support substrate 3 so that wall portions 32 and 33 extending in a direction perpendicular to a thickness direction of the support substrate 3 are formed. For example, the wall portion 32 is formed along an outer edge of a portion other than a portion in which the concave portion 31 is provided in the support substrate 3. The wall portion 33 is formed in the longitudinal direction B of the support 10 to bisect the portion other than the portion in which the concave portion 31 is provided in the support substrate 3. The support substrate 3 is formed in a rectangular plate shape in which a direction A is a thickness direction and a direction B is a longitudinal direction (see FIG. 15). The concave portion 31 and each concave portion 34 are formed in a rectangular parallelepiped shape. The support substrate 3 is formed of, for example, a resin (for example, polypropylene, styrene resin, ABS resin, polyethylene, PET, PMMA, silicone, or a liquid crystal polymer), ceramics, glass, silicon or the like and is formed integrally by molding, cutting, etching, or the like. For example, the support substrate 3 is formed of a resin with a light absorption color (for example, black) or a light reflection color (for example, white) with respect to ambient light.

A configuration of the SERS element 2 is the same as the configuration of the SERS element 2 included in the SERS unit 1 of the first embodiment described above.

Figure 18:
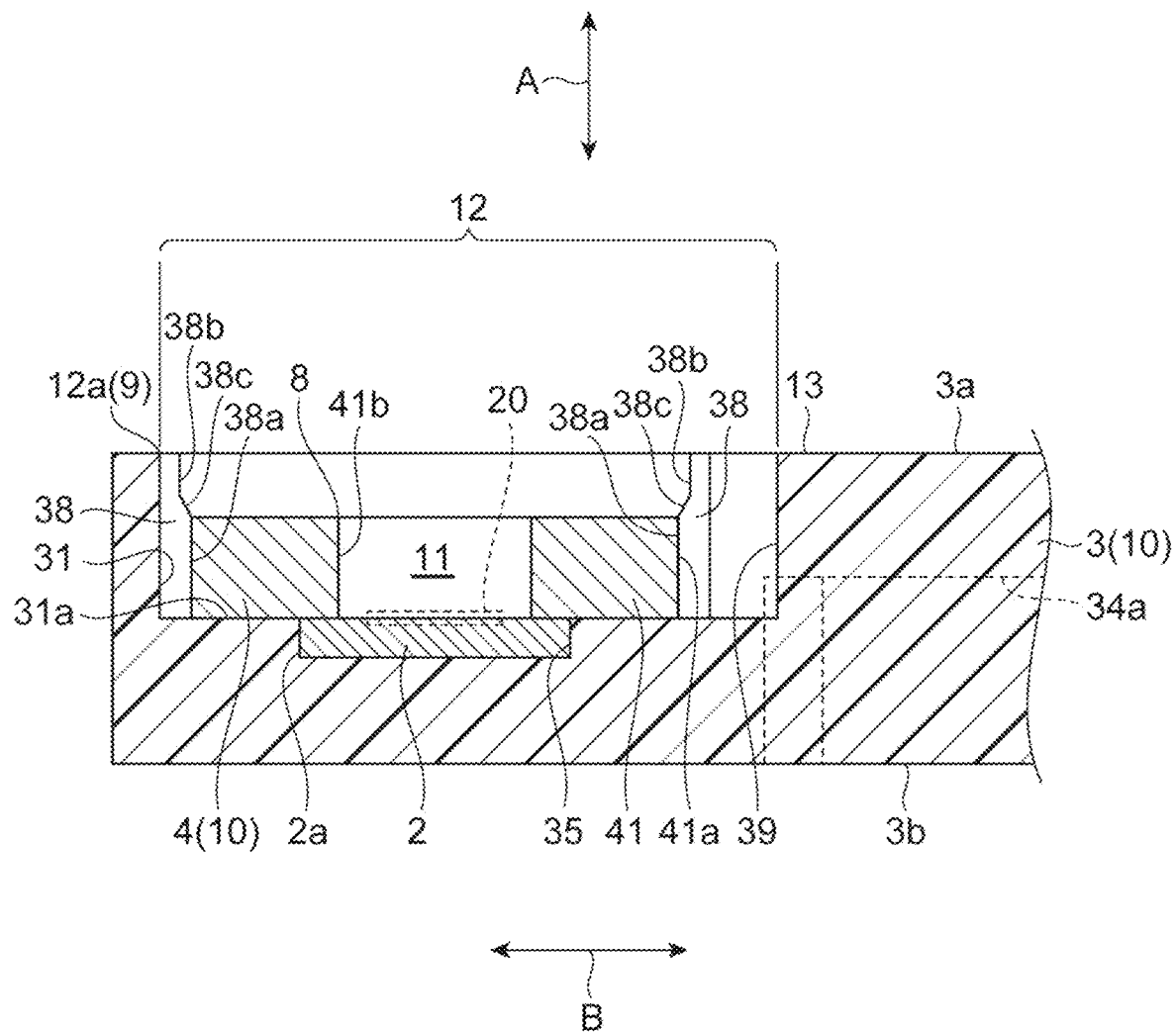
FIG. 18 is a partially enlarged cross-sectional view of the surface enhanced Raman scattering unit of FIG. 15 in which the package is omitted.

As illustrated in FIG. 18, the concave portion 35 that accommodates a portion on the substrate 21 side of the SERS element 2 is provided in the bottom surface 31a of the concave portion 31. The concave portion 35 is formed in a shape having a complementary relationship with the portion on the substrate 21 side of the SERS element 2, and regulates a movement of the SERS element 2 in a direction perpendicular to the thickness direction of the substrate 21.

Figure 19:
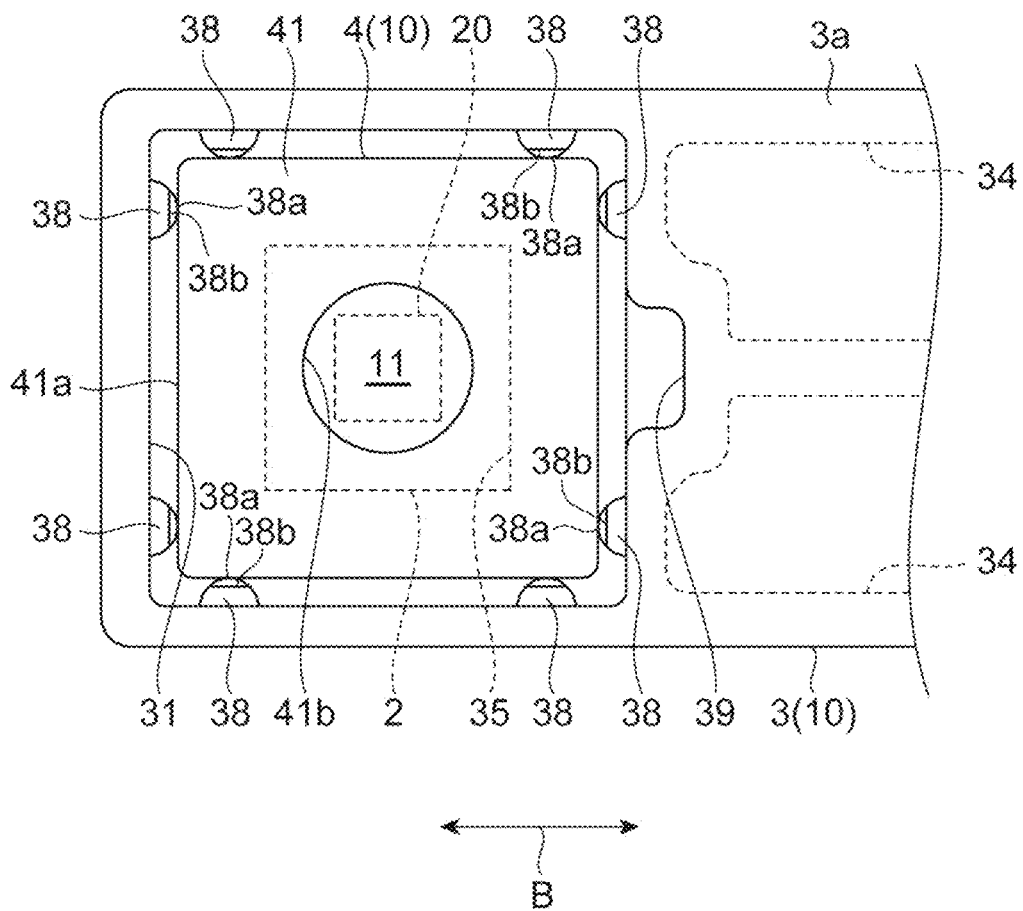
FIG. 19 is a partially enlarged plan view of the surface enhanced Raman scattering unit of FIG. 15 in which the package is omitted.

As illustrated in FIGS. 18 and 19, a plurality of convex portions 38 are disposed on the side surface of the concave portion 31 to surround the SERS element 2 when viewed in the thickness direction A of the support substrate 3. Each convex portion 38 is formed integrally with the support substrate 3 as a portion of the support substrate 3. Each convex portion 38 extends in the thickness direction A of the support substrate 3. Each convex portion 38 includes a semi-cylindrical surface shaped side surface 38a of which a center line direction is the thickness direction A of the support substrate 3. Each convex portion 38 further includes a flat surface 38b formed by cutting out a portion on the opening side of the concave portion 31. In each convex portion 38, an inclined surface 38c is formed between the side surface 38a and the flat surface 38b.

The support member 4 has a sandwiching portion 41. The sandwiching portion 41 is formed in an annular shape to surround the optical functional portion 20 when viewed in the thickness direction of the substrate 21. For example, a side surface 41a on the outer side of the sandwiching portion 41 is a square pillar surface, and a side surface 41b on the inner side of the sandwiching portion 41 is a cylindrical surface. The sandwiching portion 41 is held by the plurality of convex portions 38 in a state in which the sandwiching portion 41 surrounds the optical functional portion 20 and is in contact with the conductor layer 23 of the SERS element 2. When the support member 4 is disposed in the concave portion 31, the flat surface 38b and the inclined surface 38c of each convex portion 38 function as a guide for the sandwiching portion 41, and the side surface 41a of the sandwiching portions 41 is fitted on the side surface 38a of each convex portion 38. By sandwiching the SERS element 2 between the support substrate 3 and the sandwiching portion 41 of the support member 4 in the concave portion 35, the SERS element 2 can be mechanically held (that is, by fitting members without using an adhesive or the like) in the support 10. A widened portion 39 is provided in a portion of the side surface of the concave portion 31. In the SERS unit, the support member 4 can be removed from within the concave portion 31 by inserting a pin or the like into the widened portion 39.

For example, the sandwiching portion 41 is formed so that an outer edge thereof is rectangular and an inner edge thereof is circular when viewed in the thickness direction of the substrate 21. The plurality of convex portions 38 are provided in the support substrate 3 so that two convex portions 38 are disposed on one side surface of the rectangular parallelepiped-shaped concave portion 31. Since the inner edge of the sandwiching portion 41 is circular, action of a local pressing force on the SERS element 2 is avoided. The support member 4 is formed of, for example, a resin (for example, polypropylene, styrene resin, ABS resin, polyethylene, PET, PMMA, silicone, or a liquid crystal polymer), ceramics, glass, silicon or the like and is formed integrally by molding, cutting, etching, or the like. For example, the support member 4 is formed of a resin with a light absorption color (for example, black) or a light reflection color (for example, white) with respect to ambient light.

In the SERS unit 1 of the second embodiment configured as described above, the region extending from the inner side of the concave portion 35 of the support substrate 3 to the opening of the concave portion 31 of the support substrate 3 via the inner side of the sandwiching portion 41 of the support member 4 constitutes the cavity 11 in which the opening 12 (the opening of the concave portion 31 of the support substrate 3) is provided, as illustrated in FIG. 18. That is, the support 10 constituted by the support substrate 3 and the support member 4 has the cavity 11 provided with the opening 12. The cavity 11 is disposed at a position biased toward one side from the center of the support 10 in the longitudinal direction B of the support 10. The edge 12a of the opening 12 is located on the same plane. The region 13 surrounding the edge 12a of the opening 12 in the support 10 (the region surrounding the edge of the opening of the concave portion 31 in the surface 3a of the support substrate 3) is a flat surface.

The SERS element 2 is disposed in the cavity 11 so that the optical functional portion 20 faces the opening 12. The edge 12a of the opening 12 is located on the outer side of the outer edge 2a of the SERS element 2 when viewed in a direction in which the optical functional portion 20 faces the opening 12. In this state, the support 10 constituted by the support substrate 3 and the support member 4 is accommodated in the package 5.

In the support 10 of the SERS unit 1 of the second embodiment, the edge of the opening on the side opposite to the SERS element 2 in the sandwiching portion 41 is the first opening edge 8, and the edge 12a of the opening 12 is the second opening edge 9. The second opening edge 9 is located on the side opposite to the optical functional portion 20 relative to the first opening edge 8 in a direction in which the optical functional portion 20 faces the opening 12 (that is, direction A), and is located on the outer side of the first opening edge 8 when viewed in the direction in which the optical functional portion 20 faces the opening 12 (that is, direction A).

As illustrated in FIG. 15, the package 5 is flexible and formed in a bag shape. The package 5 is evacuated by, for example, vacuuming (that is, a gas such as air present in the package 5 is discharged to the outside of the package 5) in a state in which the package 5 accommodates the support 10 and is sealed by, for example, thermo-compression bonding. The package 5 is in contact with the edge 12a of the opening 12 and the region 13 surrounding the edge 12a of the opening 12. Thus, the opening 12 is sealed without a gap between the package 5 and the support 10. The package 5 is bent toward the optical functional portion 20 in a state in which the package 5 is spaced apart from the optical functional portion 20 in the opening 12. In the SERS unit 1 of the second embodiment, the package 5 is spaced apart from the first opening edge 8 and is in contact with the second opening edge 9. The package 5 is bent toward the inner side of each concave portion 34 in each concave portion 34 on the back surface 3b side of the support substrate 3. The bag-shaped package 5 includes a package of which a portion (for example, a bottom surface and a side surface) is hard and only the remaining portion (for example, an upper surface) is flexible.

R chamfering is performed on the opening of the concave portion 31 of the support substrate 3, the outer edge portion of the sandwiching portion 41 of the support member 4, or the like. Thus, it is possible to prevent great tension from being generated locally in the package 5 and avoid breakage of the package 5.

The configuration of the package 5 is the same as the configuration of the package 5 included in the SERS unit 1 of the first embodiment described above.

Next, a Raman spectroscopic analysis method using the SERS unit 1 of the second embodiment will be described. The Raman spectroscopic analysis method using the SERS unit 1 of the second embodiment can also be embodied similar to the Raman spectroscopic analysis method using the SERS unit 1 of the first embodiment. In the SERS unit 1 of the second embodiment, since the cavity 11 is disposed at a position biased toward one side from the center of the support 10 in the longitudinal direction B of the support 10, only a portion on one side in which the cavity 11 is disposed in the support 10 is located in the Raman spectroscopic analysis device from an insertion port provided in the Raman spectroscopic analysis device, and the Raman spectroscopic analysis can be performed.

Next, effects of the SERS unit 1 of the second embodiment will be described. In the SERS unit 1, the support 10 constituted by the support substrate 3 and the support member 4 is accommodated in the evacuated package 5, as illustrated in FIG. 15. Therefore, it is possible to prevent moisture and other foreign matters from entering the cavity 11 via the opening 12 of the cavity 11. Further, even when, for example, the support substrate 3 and the support member 4 are formed of a resin, it is possible to prevent moisture from entering the cavity 11 via the support 10 itself. Further, the package 5 is in contact with the edge 12a of the opening 12 and is bent toward the optical functional portion 20 side in a state in which the package 5 is spaced apart from the optical functional portion 20 in the opening 12. Therefore, it is possible to stably form a narrow sealed space in the cavity 11 while preventing physical interference between the package 5 and the optical functional portion 20. Therefore, according to the SERS unit 1, it is possible to stably prevent deterioration of the optical functional portion 20 due to various factors.

Further, in the SERS unit 1, the package 5 is spaced apart from the first opening edge 8 of the support 10, and is in contact with the second opening edge 9 of the support 10. Accordingly, since the package 5 is bent at the second opening edge 9 spaced apart from the optical functional portion relative to the first opening edge 8 in both of the thickness direction A and the longitudinal direction B of the support substrate 3, it is possible to more strongly perform exhaust from the package 5 while preventing physical interference between the package 5 and the optical functional portion 20. Further, since the cavity 11 is widened by the opening of the concave portion 31, balance of the entire support 10 including the concave portion 34 provided on the back surface 3b of the support substrate 3 is improved (that is, a geometrical imbalance of the support 10 due to a size difference between the concave portions provided on the surface 3a and the back surface 3b of the support substrate 3 is reduced), and therefore it is possible to prevent an uneven stress from being generated in the support 10 at the time of exhaust from the package 5. In the SERS unit 1, since the cavity 11 is disposed at a position biased toward one side from the center of the support 10 in the longitudinal direction B of the support 10, it is important to improve the balance of the entire support 10 including the concave portion 34 provided on the back surface 3b of the support substrate 3.

Further, in the SERS unit 1, the edge 12a of the opening 12 is located on the same plane, and the region 13 surrounding the edge 12a of the opening 12 in the support 10 is a flat surface. Accordingly, the package 5 is more reliably brought into contact with the edge 12a of the opening 12, such that a narrow sealed space can be more stably formed in the cavity 11.

Further, in the SERS unit 1, the cavity 11 is disposed at a position biased toward one side from the center of the support 10 in the longitudinal direction B of the support 10. Accordingly, even when the support 10 formed in a plate shape is warped, the stress caused by the warpage of the support 10 is smaller at the position biased toward one side from the center of the support 10 than at the center of the support 10, and therefore it is possible to prevent an influence of the stress on the optical functional portion 20. Further, even when the support 10 formed in a plate shape is warped, a degree of warpage of the support 10 is smaller at a position biased toward the one side from the center of the support 10 than at the center of the support 10, and therefore the SERS element 2 is stably held in the cavity 11 (specifically, in the concave portion 35).

Further, in the SERS unit 1, the support substrate 3 and the support member 4 (that is, the support 10) are formed of a resin with a light absorption color (for example, black) or a light reflection color (for example, white) with respect to ambient light. Thus, it is possible to prevent ambient light from entering the cavity 11 via the support 10 and to accurately embody Raman spectroscopic analysis. In particular, when only a portion on one side in which the cavity 11 is disposed in the support 10 is located in the Raman spectroscopic analysis device from an insertion port provided in the Raman spectroscopic analysis device and the Raman spectroscopic analysis is performed, ambient light easily enters the cavity 11 through a portion on the other side in which the cavity 11 is not disposed in the support 10, and therefore it is important to form the support 10 using the resin having the color described above.

Further, in the SERS unit 1, the package 5 includes the moisture absorption layer 52a that absorbs moisture in the package 5. Accordingly, even when there is moisture in the cavity 11 or moisture is contained in the support 10 itself when the support 10 is accommodated in the package 5, such moisture is absorbed by the moisture absorption layer 52a, such that deterioration of the optical functional portion 20 due to such moisture can be prevented. In particular, since the moisture absorption layer 52a faces the cavity 11, it is possible to efficiently remove the moisture in the cavity 11. Further, since the package 5 is in close contact with the support 10 due to exhaust, the moisture contained in the support 10 itself can be efficiently absorbed by the moisture absorption layer 52a.

Further, in the SERS unit 1, the support 10 having one cavity 11 is accommodated in one package 5. Thus, it is possible to prevent the shape of the sealed space formed in the cavity 11 from varying when the package 5 is bent. Therefore, it is possible to reduce individual differences among a plurality of the SERS units 1, and more stably prevent the deterioration of the optical functional portion 20.

Further, in the SERS unit 1, the package 5 is bent on the inner side of the concave portion 34 in each concave portion 34 of the back surface 3b side of the support substrate 3.

Thus, it is possible to reduce a volume in the package 5 after sealing, and to suppress the amount of moisture contained in the package 5. Further, a surface area of the moisture absorption layer 52a is increased due to bending of the package 5 in each concave portion 34. Accordingly, it is possible to build a low humidity environment in the package 5.

Further, in the SERS unit 1, the package 5 has an aluminum layer 51b. Thus, external air and moisture are prevented from entering the package 5, and light is prevented from being incident on the package 5, for example. Therefore, it is possible to prevent the respective portions constituting the SERS unit 1 from deteriorating due to external air, moisture, light, or the like. Further, the aluminum layer 51b is less ductile than the other layers. Therefore, it is possible to prevent the package 5 from being greatly bent and brought into contact with the optical functional portion 20 in the opening 12.

Further, in the SERS unit 1, a bottom surface 34a of the concave portion 34 is located on the surface 3a side of the support substrate 3 relative to the bottom surface 31a of the concave portion 31 in the thickness direction A of the support substrate 3, as illustrated in FIG. 15. Accordingly, a depth of the concave portion 34 increases, that is, a thickness of a portion in which the concave portion 31 is not disposed in the support substrate 3 decreases, and a thickness of the entire support substrate 3 is uniform. Therefore, it is possible to reduce the risk of warping the entire support 10.

Further, the surface 3a of the support substrate 3 is configured as a flat surface. Accordingly, for example, when the SERS unit 1 is set in the Raman spectroscopic analysis device 60, the surface 3a of the support substrate 3 can stably abut a predetermined surface of the Raman spectroscopic analysis device 60. That is, it is possible to cause the surface 3a of the support substrate 3 to function as a positioning surface. Further, when the SERS element 2 and the support member 4 are disposed in the concave portion 31, the SERS element 2 and the support member 4 can be slid on the surface 3a of the support substrate 3. That is, the surface 3a of the support substrate 3 can be caused to function as a guide surface.

Further, forming the surface 3a of the support substrate 3 as the flat surface is also reasonable from the viewpoint of molding and fabrication of the support substrate 3. For example, when the portion in which the concave portion 31 is not disposed in the support substrate 3 is disposed at the center (the center in the thickness direction A of the support substrate 3) relative to the portion in which the concave portion 31 is disposed in the support substrate 3, an opening surface area is increased on both of the surface 3a side and the back surface 3b side of the support substrate 3, a difficulty of mold release after the support substrate 3 is molded and fabricated increases, and the risk of occurrence of mold release failure increases.

Further, for example, when the portion in which the concave portion 31 is not disposed in the support substrate 3 is disposed on the back surface 3b side relative to the portion in which the concave portion 31 is disposed in the support substrate 3, "a projecting pin in the mold" (an ejector pin) needed when a molded product is released from the mold after the molding is routinely disposed on the surface 3a side of the support substrate 3, but as a result, a trace of the ejector pin is formed on the surface 3a of the support substrate 3, and an appearance of the surface 3a of the support substrate 3 deteriorates.

Thus, disposing the portion in which the concave portion 31 is not disposed in the support substrate 3 on the surface 3a relative to the portion in which the concave portion 31 is disposed in the support substrate 3, and forming the surface 3a of the support substrate 3 as a flat surface are important in achieving risk reduction in molding fabrication and improvement of an appearance impression.

Further, since the bottom surface 34a of the concave portion 34 is located on the surface 3a side of the support substrate 3 relative to the bottom surface 31a of the concave portion 31 in the thickness direction A of the support substrate 3, the optical functional portion 20 is separated from the surface 3a of the support substrate 3. Thus, contamination risk of the optical functional portion 20 is reduced, unlike a case in which the optical functional portion 20 is disposed flush with the surface 3a of the support substrate 3.

Further, in the SERS unit 1, the support member 4 is thin, and the surface of the support member 4 on the side opposite to the bottom surface 31a of the concave portion 31 is located on the back surface 3b side of the support substrate 3 relative to the surface 3a of the support substrate 3. The support member 4 is thin, and therefore the risk of the warpage of the support member 4 is reduced. Further, for example, when the surface 3a of the support substrate 3 abuts a predetermined surface of the Raman spectroscopic analysis device 60 and the SERS unit 1 is set in the Raman spectroscopic analysis device 60, a region around the concave portion 31 on the surface 3a of the support substrate 3 abuts the predetermined surface of the Raman spectroscopic analysis device 60, and therefore the SERS unit 1 can be stably set in the Raman spectroscopic analysis device 60 and Raman spectroscopic analysis can be stably performed.

Further, in the SERS unit 1, the plurality of convex portions 38 are provided in the concave portion 31. As illustrated in FIG. 19, a size of a plane constituted by a flat surface 38b of each convex portion 38 is larger than a size of a plane constituted by a top of the side surface 38a of each convex portion 38. Thus, the support member 4 can be easily disposed in the concave portion 31. Further, the support member 4 is fitted in the side surface 38a of each convex portion 38 by pressing the support member 4 toward the bottom surface 31a of the concave portion 31, and the support member 4 is accurately located at a predetermined position in the concave portion 31.

Further, each convex portion 38 protrudes from the side surface to the inner side of the concave portion 31 when viewed in the thickness direction A of the support substrate 3. Thus, for example, even when the support member 4 is fabricated through molding and a convex portion is left on the side surface 41a on the outer side of the support member 4 by cutting of a gate thereof (an inlet through which a resin flows at the time of molding), the convex portion left on the support member 4 can be prevented from interfering with the side surface of the concave portion 31 of the support substrate 3 since fitting is not performed in the side surface of the concave portion 31 of the support substrate 3 and the side surface of the support member 4.

Further, in the SERS unit 1, since fixing of the support substrate 3 and the support member 4 is implemented in a side surface of the support member 4, it is not necessary for leg portions to be provided in the support member 4 or for fitting holes to be provided on the bottom surface 31a of the concave portion 31, and it is possible to reduce a size of the SERS unit 1 by reducing a thickness of the support substrate 3.

The first and second embodiments of the present invention have been described above, but the present invention is not limited to the first and second embodiments. For example, the region 13 surrounding the edge 12a of the opening 12 in the support 10 may not be a flat surface and the edge 12a of the opening 12 may not be located on the same plane as long as the package 5 can be brought into contact with at least the edge 12a of the opening 12 due to the exhaust.

Further, the evacuated bag-shaped package 5 is not limited to a package that is evacuated by vacuuming, and may be a package that is evacuated by pressing the package 5 from the outer side so that a gas in the package 5 is pushed out.

Further, the package 5 may not have the moisture absorption layer 52a. In this case, a moisture absorption member such as a moisture absorption sheet may be separately accommodated in the package 5. In such a case, since the package 5 brought in close contact with the support 10 by evacuating the inside suppresses shift of the moisture absorption sheet from a desired position (for example, on the opening 12 and the region 13), it is possible to reduce individual differences among a plurality of SERS units 1. Further, an absorption portion that absorbs a carbon dioxide gas or oxygen may be provided in place of the moisture absorption layer 52a and the moisture absorption member or together with the moisture absorption layer 52a and the moisture absorption member. When carbon dioxide gas is absorbed, calcium hydroxide, sodium hydroxide, potassium hydroxide, lithium hydroxide, or the like may be used for the absorption portion. When oxygen is absorbed, iron or the like may be used for the absorption portion.

Further, the fine structure portion 24 may be indirectly formed on the surface 21a of the substrate 21, for example, via the support portion 25, or may be directly formed on the surface 21a of the substrate 21. Further, the conductor layer 23 is not limited to a layer directly formed on the fine structure portion 24, and may be a layer that is indirectly formed on the fine structure portion 24 via any layer such as a buffer metal (for example, Ti or Cr) layer for improving close contact of a metal with the fine structure portion 24. Further, the fine structure portion 24 may be directly formed on the support 10 without passing through the substrate 21. That is, the optical functional portion 20 causing the surface enhanced Raman scattering may be directly formed on the support 10.

Further, the material and the shape of each configuration of the SERS unit 1 are not limited to the above-described material and shape, and various materials and shapes can be applied. For example, the support substrate 3 and the support member 4 may be formed of a transparent resin instead of colored resins. In this case, it is possible to prevent the risk of deterioration of the optical functional portion due to a coloring component of the resin that is outgassed. Further, when an alignment mark is provided on the stage 61 and the support substrate 3 of the Raman spectroscopic analysis device, the Raman spectroscopic analysis device 60 can recognize the alignment mark via the transparent support substrate 3 and automatically perform alignment. The annular shape is not limited to a round shape, and includes an annular shape having other shapes such as a rectangular annular shape.

INDUSTRIAL APPLICABILITY

According to the present invention, it is possible to provide a surface enhanced Raman scattering unit capable of stably preventing deterioration of the optical functional portion due to various factors.

REFERENCE SIGNS LIST

1: SERS unit (Surface enhanced Raman scattering unit), 2: SERS element (Surface enhanced Raman scattering element), 2a: Outer edge, 5: Package, 8: First opening edge, 9: Second opening edge, 10: Support, 11: Cavity, 12: Opening, 12a: Edge, 13: Region, 20: Optical functional portion, 52a: Moisture absorption layer.

The invention claimed is:

1. A surface enhanced Raman scattering unit, comprising:
   a support that includes a cavity provided with an opening;
   an optical functional portion that is disposed in the cavity to face the opening and causes surface enhanced Raman scattering; and
   a package that accommodates the support and is evacuated,
   wherein the package is in contact with at least an edge of the opening, and is bent toward the optical functional portion in a state in which the package is spaced apart from the optical functional portion in the opening,
   the package is flexible, and
   the package is configured such that a portion along a surface of the support and a portion bent at the opening are joined.

2. The surface enhanced Raman scattering unit according to claim 1,
   wherein the support comprises:
   a first opening edge; and
   a second opening edge located on the side opposite to the optical functional portion relative to the first opening edge and located on the outer side of the first opening edge when viewed in a direction in which the optical functional portion faces the opening,
   the edge of the opening is the first opening edge, and
   the package is in contact with the first opening edge and the second opening edge.

3. The surface enhanced Raman scattering unit according to claim 1,
   wherein the support comprises:
   a first opening edge; and
   a second opening edge located on the side opposite to the optical functional portion relative to the first opening edge and located on the outer side of the first opening edge when viewed in a direction in which the optical functional portion faces the opening,
   the edge of the opening is the second opening edge, and
   the package is spaced apart from the first opening edge and is in contact with the second opening edge.

4. The surface enhanced Raman scattering unit according to claim 1,
   wherein the support is an elongated body, and
   the cavity is disposed at a center of the support in a longitudinal direction of e support.

5. The surface enhanced Raman scattering unit according to claim 1,
   wherein the support is an elongated body, and
   the cavity is disposed at a position biased toward one side from a center of the support in a longitudinal direction of the support.

6. The surface enhanced Raman scattering unit according to claim 1,
   wherein the edge of the opening is located on a same plane as the support in a longitudinal direction of the support.

7. The surface enhanced Raman scattering unit according to claim 6,
    wherein a region of the support surrounding the edge of tlae opening in the support is a flat surface.

8. The surface enhanced Raman scattering unit according to claim 1,
    wherein the package includes a moisture absorption layer that absorbs moisture in the package.

9. The surface enhanced Raman scattering unit according to claim 1,
    wherein the optical functional portion is provided in a surface enhanced Raman scattering element,
    the surface enhanced Raman scattering element is disposed in the cavity so that the optical functional portion faces the opening, and
    the edge of the opening is located on an inner side of an outer edge of the surface enhanced Raman scattering element when viewed in a direction in which the optical functional portion faces the opening.

* * * * *